United States Patent [19]
Hill et al.

[11] Patent Number: 5,511,197
[45] Date of Patent: Apr. 23, 1996

[54] METHOD AND SYSTEM FOR NETWORK MARSHALLING OF INTERFACE POINTERS FOR REMOTE PROCEDURE CALLS

[75] Inventors: Richard D. Hill, Kirkland; Antony S. Williams, Redmond; Robert G. Atkinson, Woodinville, all of Wash.; Tom Corbett, Eugene, Oreg.; Paul Leach, Seattle, Wash.; Shannon J. Chan, Bellevue; Alexander A. Mitchell; Edward K. Jung, both of Redmond, all of Wash.; Craig H. Wittenberg, Mercer Island, Wash.

[73] Assignee: Microsoft Corporation, Redmond, Wash.

[21] Appl. No.: 158,627

[22] Filed: Nov. 29, 1993

Related U.S. Application Data

[63] Continuation-in-part of Ser. No. 975,775, Nov. 13, 1992, abandoned.

[51] Int. Cl.⁶ ................................................. G06F 9/30
[52] U.S. Cl. ....................... 395/700; 364/DIG. 1; 364/280; 364/286
[58] Field of Search ...................................... 395/700, 650

[56] References Cited

U.S. PATENT DOCUMENTS

| | | | |
|---|---|---|---|
| 5,007,080 | 4/1991 | MacMillan et al. | 379/269 |
| 5,187,790 | 2/1993 | East et al. | 395/725 |
| 5,218,699 | 6/1993 | Brandle et al. | 395/650 |
| 5,307,490 | 4/1994 | Davidson et al. | 395/650 |
| 5,329,619 | 7/1994 | Pagé et al. | 395/200 |
| 5,377,350 | 12/1994 | Skinner | 395/600 |
| 5,430,876 | 7/1995 | Schreider et al. | 395/650 |

FOREIGN PATENT DOCUMENTS

WO93/06548  4/1993  Germany ............... G06F 9/46R6

OTHER PUBLICATIONS

Andrew D. Birrell et al., "Implementing Remote Procedure Calls", *ACM Transactions on Computer Systems*, vol. 2, No. 1, Feb., 1984, pp. 39–59.

Brent Hailpern et al., "Extending Objects to Support Multiple Interfaces and Access Control," *IEEE Transactions on Software Engineering*, vol. 16, No. 11, Nov., 1990, pp. 1247–1257.

Henry M. Levy et al., "Modules, Objects and Distributed Programming: Issues in RPC and Remote Object Invocation", *Software Practice & Experience*, vol. 21, No. 1, Jan., 1991, pp. 77–90.

John K. Bennett, "Experience with Distributed Smalltalk", *Software Practice & Experience*, vol. 20, No. 2, Feb., 1990, pp. 157–180.

Marc Shapiro, "Structure and Encapsulation in Distributed System: The Proxy Principle," *IEEE Computer Society—The 6th International Conference on Distributed Computing Systems*, May 19–23, 1986, pp. 198–205.

Primary Examiner—Kevin A. Kriess
Attorney, Agent, or Firm—Seed and Berry

[57] ABSTRACT

A computer method and system for passing a pointer to an interface from a server process to a client process. In a preferred embodiment, the server process instantiates an object that has multiple interfaces. The server process identifies an interface to pass to the client process and creates a stub object for receiving a request to invoke a function member of the interface and for invoking the requested function member upon receiving the request. The server process then sends an identifier of the stub to the client process. When the client process receives the identifier of the stub, it instantiates a proxy object for receiving requests to invoke a function member of the interface and for sending the request to the identified stub. The client process can then invoke the function members of the interface by invoking function members of the proxy object. The proxy object sends a request to the identified stub. The identified stub then invokes the corresponding function member of the interface.

50 Claims, 17 Drawing Sheets

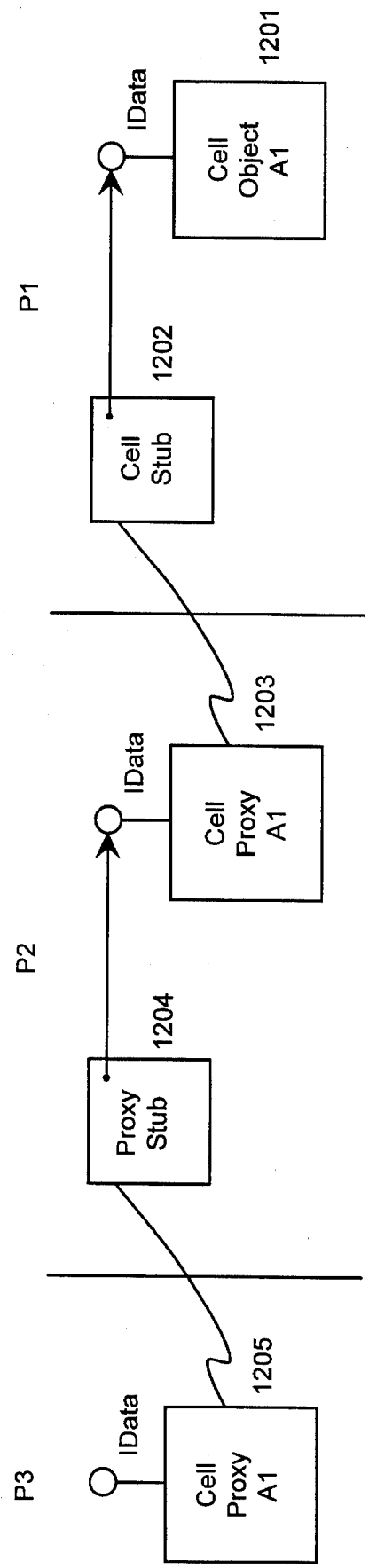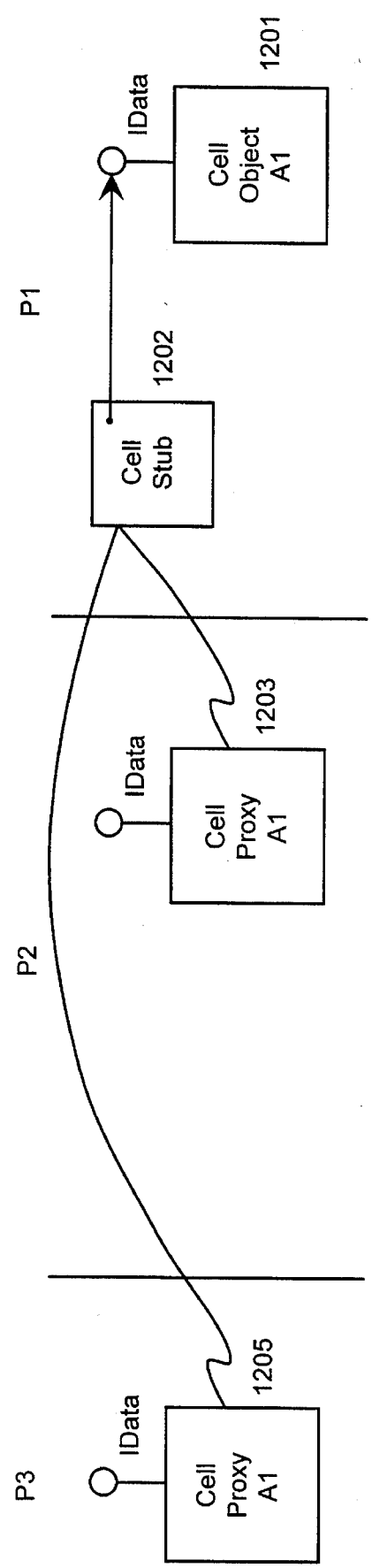
*Figure 12A*
*Figure 12B*

METHOD AND SYSTEM FOR NETWORK MARSHALLING OF INTERFACE POINTERS FOR REMOTE PROCEDURE CALLS

This application is a continuation-in-part of U.S. Ser. No. 07/975,775, filed on Nov. 13, 1992, now abandoned.

TECHNICAL FIELD

This invention relates generally to a computer method and system for passing data and, more specifically, to a method and system for passing pointers to objects between processes.

BACKGROUND OF THE INVENTION

Computer systems typically have operating systems that support multitasking. A multitasking operating system allows multiple tasks (processes) to be executing concurrently. For example, a database server process may execute concurrently with many client processes, which request services of the database server process. A client process (client) may request services by issuing a remote procedure call (RPC). A remote procedure call allows a server process (server) to invoke a server procedure on behalf of the client. To issue a remote procedure call, the client packages the procedure name and the actual in-parameters for the procedure into an interprocess communications message and sends the message to the server. The server receives the message, unpackages the procedure name and any actual in-parameters, and invokes the named procedure, passing it the unpackaged in-parameters. When the procedure completes, the server packages any out-parameters into a message and sends the message to the client. The client receives the message and unpackages the out-parameters. The process of packaging parameters is known as marshalling, and the process of unpackaging parameters is known as unmarshalling.

Parameters may be marshalled by storing a copy of the value of the actual parameter in a message. For certain types of parameters, the marshalling may involve more than simply storing a copy of the value. For example, a floating point value may need to be converted from the format of one computer system to the format of another computer system when the processes reside on different computer systems.

The copying of the value of an actual parameter has a couple disadvantages. First, when a copy is passed, changes to the original value are not reflected in the copy. For example, if a parameter representing a time of day value is passed from a client to a server by copying, then the copy that the server receives is not updated as the client updates its time of day value. Second, with certain types of parameters, it may be impractical to make a copy of the value. For example, the overhead of copying a large array may be unacceptable. As discussed in the following, it may also be impractical to make a copy of an object when marshalling the object because the object may be large and include various functions.

The use of object-oriented programming techniques have many advantages over prior techniques. Thus, the use of object-oriented techniques is increasing. However, the inability to efficiently marshal and unmarshal objects when invoking remote procedures limit these advantages. A description of how objects are typically marshalled and unmarshalled will help to explain these limits.

FIG. 1 is a block diagram illustrating typical data structures used to represent an object. An object is composed of instance data (data members) and member functions, which implement the behavior of the object. The data structures used to represent an object comprise instance data structure 101, virtual function table 102, and the function members 103, 104, 105. The instance data structure 102 contains a pointer to the virtual function table 102 and contains data members. The virtual function table 102 contains an entry for each virtual function member defined for the object. Each entry contains a reference to the code that implements the corresponding function member. The layout of this sample object conforms to the model defined in U.S. Pat. No. 5,297,284, entitled "A Method for Implementing Virtual Functions and Virtual Bases in a Compiler for an Object Oriented Programming Language," which is hereby incorporated by reference. In the following, an object will be described as an instance of a class as defined by the C++ programming language. One skilled in the art would appreciate that objects can be defined using other programming languages.

If an object in a server process is to be copied and passed to a client process during a remote procedure call, then not only the data members must be copied, but also the function members must be accessible to the client process. To access the copied object, the client process would need to load each function member into its own process space. This loading can be time consuming. Moreover, the copying of an object may be intractable because a function member loaded in the server process space may need to access data or other functions in the server process space.

An advantage of using object-oriented techniques is that these techniques can be used to facilitate the creation of compound documents. A compound document is a document that contains objects generated by various computer programs. (Typically, only the data members of the object and the class type are stored in a compound document.) For example, a word processing document that contains a spreadsheet object generated by a spreadsheet program is a compound document. A word processing program allows a user to embed a spreadsheet object (e.g., a cell) within a word processing document. To allow this embedding, the word processing program would be compiled using the class definition of the object to be embedded to access function members of the embedded object. Thus, the word processing program would need to be compiled using the class definition of each class of objects that can be embedded in a word processing document. To embed an object of a new class into a word processing document, the word processing program would need to be recompiled with the new class definition. Thus, only objects of classes selected by the developer of the word processing program can be embedded. Furthermore, new classes can only be supported with a new release of the word processing program.

To allow objects of an arbitrary class to be embedded into compound documents, interfaces (abstract classes) are defined through which an object can be accessed without the need for the word processing program to have access to the class definitions at compile time. An abstract class is a class in which a virtual function member has no implementation (pure). An interface is an abstract class with no data members and whose virtual functions are all pure.

The following class definition is an example definition of an interface. In this example, for simplicity of explanation, rather than allowing any class of object to be embedded in its documents, a word processing program allows spreadsheet objects to be embedded. Any spreadsheet object that provides this interface can be embedded, regardless of how the object is implemented. Moreover, any spreadsheet object, whether implemented before or after the word processing program is compiled, can be embedded.

```
class ISpreadSheet
    { virtual void File( ) = 0;
      virtual void Edit( ) = 0;
      virtual void Formula( ) = 0;
      virtual void Format( ) = 0;
```

```
      virtual void GetCell (string RC, cell *pCell) = 0;
      virtual void Data( ) = 0;
      ...
    }
```

The developer of a spreadsheet program would need to provide an implementation of the interface to allow the spreadsheet objects to be embedded in a word processing document. When the word processing program embeds a spreadsheet object, the program needs access to the code that implements the interface for the spreadsheet object. To access the code, each implementation is given a unique class identifier. For example, a spreadsheet object developed by Microsoft Corporation may have a class identifier of "MSSpreadsheet," while a spreadsheet object developed by another corporation may have a class identifier of "LTSSpreadsheet." A persistent registry in each computer system is maintained that maps each class identifier to the code that implements the class. Typically, when a spreadsheet program is installed on a computer system, the persistent registry is updated to reflect the availability of that class of spreadsheet objects. So long as a spreadsheet developer implements each function member defined by the interface and the persistent registry is maintained, the word processing program can embed the developer's spreadsheet objects into a word processing document.

Various spreadsheet developers may wish, however, to implement only certain function members. For example, a spreadsheet developer may not want to implement database support, but may want to support all other function members. To allow a spreadsheet developer to support only some of the function members, while still allowing the objects to be embedded, multiple interfaces for spreadsheet objects are defined. For example, the interfaces IDatabase and IBasic may be defined liar a spreadsheet object as follows.

```
class IDatabase
    { virtual void Data( ) = 0;
    }
class IBasic
    { virtual void File( ) = 0;
      virtual void Edit( ) = 0;
      virtual void Formula( ) = 0;
      virtual void Format( ) = 0;
      virtual void GetCell (string RC, cell *pCell) = 0;
      ...
```

```
    }
```

Each spreadsheet developer would implement the IBasic interface and, optionally, the IDatabase interface.

At run time, the word processing program would need to determine whether a spreadsheet object to be embedded supports the IDatabase interface. To make this determination, another interface is defined (that every spreadsheet object implements) with a function member that indicates which interfaces are implemented for the object. This interface is known as IUnknown and is defined by the following.

```
class IUnknown
    { virtual boolean QueryInterface (iidInterface, pInterface) = 0;
      virtual boolean AddRef( ) = 0;
      virtual boolean Release( ) = 0
    }
```

The IUnknown interface defines the function member (method) QueryInterface. The method QueryInterface is passed an interface identifier (e.g., "IDatabase") and returns a pointer to the implementation of the identified interface for the object for which the method is invoked. If the object does not support the interface, then the method returns a false. The methods AddRef and Release provide reference counting of the interface.

The IDatabase interface and IBasic interface inherit the IUnknown interface. Inheritance is well known in object-oriented techniques by which a class definition can incorporate the data and function members of previously-defined classes. The following definitions illustrate the use of the IUnknown interface.

```
class IDatabase : IUnknown
    { virtual void Data( ) = 0; .
    }
class IBasic : IUnknown
    { virtual void File( ) = 0;
      virtual void Edit( ) = 0;
      virtual void Formula( ) = 0;
      virtual void Format( ) = 0;
      virtual void GetCell (string RC, cell *pCell) = 0;
      ...
    }
```

FIG. 2 is a block diagram illustrating a sample data structure of a spreadsheet object. The spreadsheet object comprises interface data structure 201, IBasic interface data structure 202, IDatabase interface data structure 205, and methods 208 through 212. The interface data structure 201 contains a pointer to each interface implemented and may contain data members of the implementation. The IBasic interface data structure 202 contains instance data structure 203 and virtual function table 204. Each entry in the virtual function table 204 points to a method defined for the IBasic interface. The IDatabase interface data structure 205 contains instance data structure 206 and virtual function table 207. Each entry in the virtual function table 207 contains a pointer to a method defined in the IDatabase interface. Since the IBasic and IDatabase interfaces inherit the IUnknown interface, each virtual function table 204 and 207 contains a pointer to the method QueryInterface 208. In the following, an object data structure is represented by the shape 213 labeled with an interface through which the object may be accessed.

The following pseudocode illustrates how a word processing program determines whether a spreadsheet object supports the IDatabase interface.

```
if (pIBasic->QueryInterface("IDatabase", &pIDatabase))

\* IDatabase supported else

\* IDatabase not supported
```

The pointer pIBasic is a pointer to the IBasic interface of the object. If the object supports the IDatabase interface, the method QueryInterface sets the pointer pIDatabase to point to the IDatabase data structure and returns true as its value.

Normally, an object can be instantiated (an instance of the object created in memory) by a variable declaration or by the "new" operator. However, both techniques of instantiation need the class definition at compile time. A different technique is needed to allow a word processing program to instantiate a spreadsheet object at run time. One technique provides an interface called IClassFactory, which is defined in the following.

```
class IClassFactory : IUnknown
{
    virtual void CreateInstance (iidInterface, &pInterface)=0;
}
```

The method CreateInstance instantiates an object and returns a pointer pInterface to the interface of the object designated by argument iidInterface.

Although the use of the above described interfaces can be used to facilitate embedding objects in a compound document, an efficient technique is needed for allowing pointers to objects (interfaces) to be passed as parameters in a remote procedure call. The passing of pointers avoids the overhead of copying objects and allows the receiving process to see changes that the sending process makes to the object.

SUMMARY OF THE INVENTION

It is an object of the present invention to provide a method and system for allowing a client process to access an interface of an object instantiated in a server process in a computer network environment.

It is another object of the present invention to provide a method and system for allowing an object to implement methods for class-specific (custom) marshalling and unmarshalling of pointers to the object in a network environment.

It is another object of the present invention to provide a method and system for passing pointers to interfaces of object between processes in a network environment.

It is another object of the present invention to provide a method and system in which object proxies, interface proxies, object stubs, and interface stubs can automatically be generated from a class definition.

These and other objects, which will become apparent as the invention is more fully described below, are obtained by a method and system for passing a pointer to an interface from a server process to a client process when the server process and client process are executing on different nodes in a computer network. In a preferred embodiment, the server process instantiates an object that has multiple interfaces. The server process identifies an interface to pass to the client process. The server process creates an object stub, an object interface, and a stub channel corresponding to the interface. The server process then directs the stub channel to send an identifier of the interface to the client process. When the client process receives the identifier of the interface, it instantiates an object proxy, an interface proxy, and a proxy channel. The interface proxy receives requests to invoke a function member of the interface, marshals any parameters, and forwards the invocation to the proxy channel. The proxy channel and the request to the stub channel of the server. The stub channel of the server forwards the request to the appropriate interface stub, which unmarshals time parameters and invokes the corresponding method of the marshalled interface.

BRIEF DESCRIPTION OF THE DRAWINGS

FIGS. 12A and 12B are block diagrams illustrating custom marshalling to avoid proxy-to-proxy messages.

DETAILED DESCRIPTION OF THE INVENTION

The present invention provides a method and system for passing pointers to objects as parameters in a remote procedure call in a computer network environment. In a preferred embodiment, a server process passes a pointer to an interface of an object to a client process. The server marshals a pointer to the interface and sends the marshalled pointer to the client. The client process unmarshals the pointer and accesses the passed object using the unmarshalled pointer. The marshalling and unmarshalling techniques of the present invention load code and generate data structures to support the accessing of the object by the client. In the following, marshalling of an interface pointer within a single node of a network is first described followed by a description of inter-node marshalling of an interface pointer. One skilled in the art would appreciate that the inter-node marshalling techniques can be adapted for intra-node marshalling.

INTRA-NODE MARSHALLING

Figure 1:
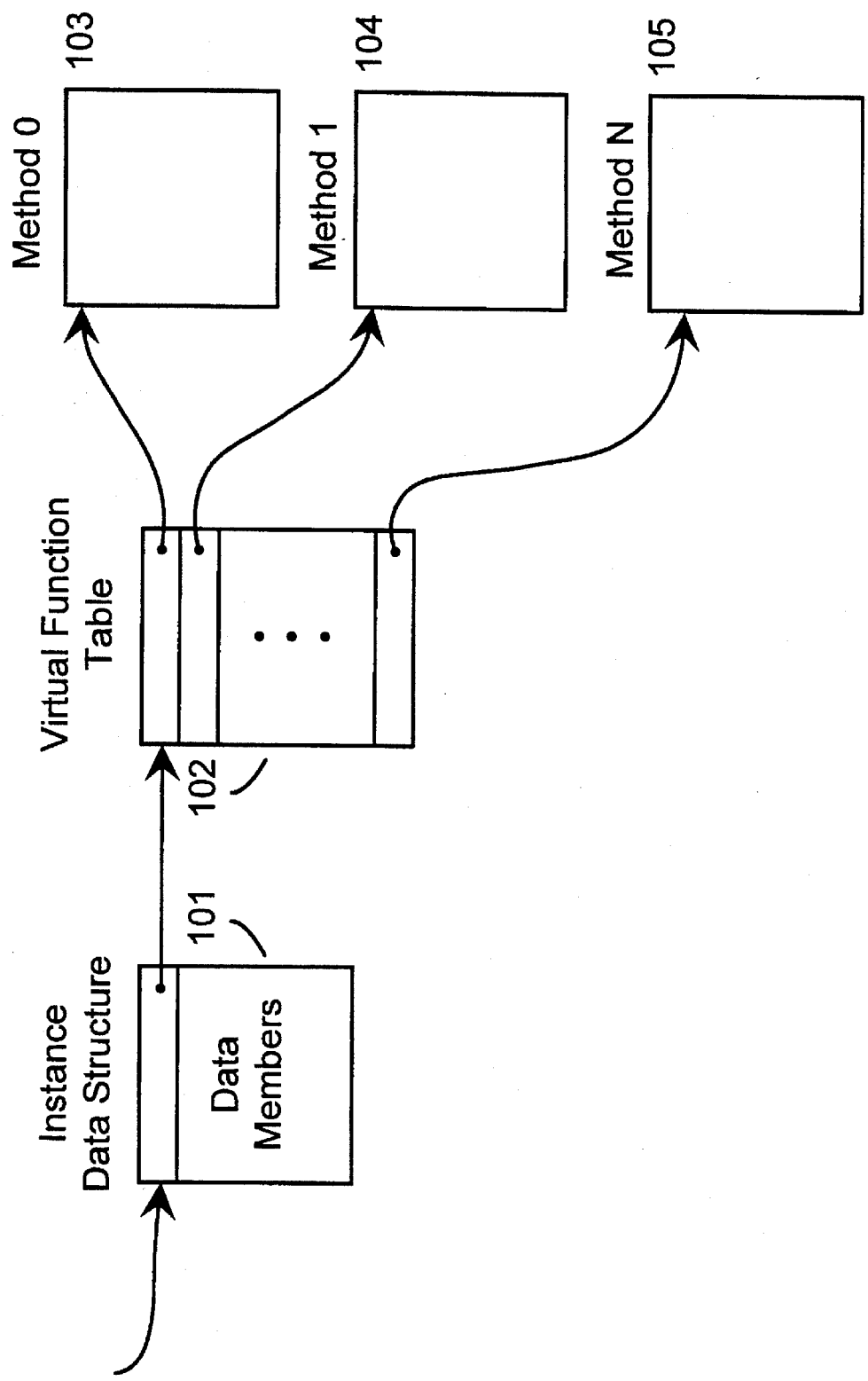
FIG. 1 is a block diagram illustrating typical data structures used to represent an object.
Figure 2:
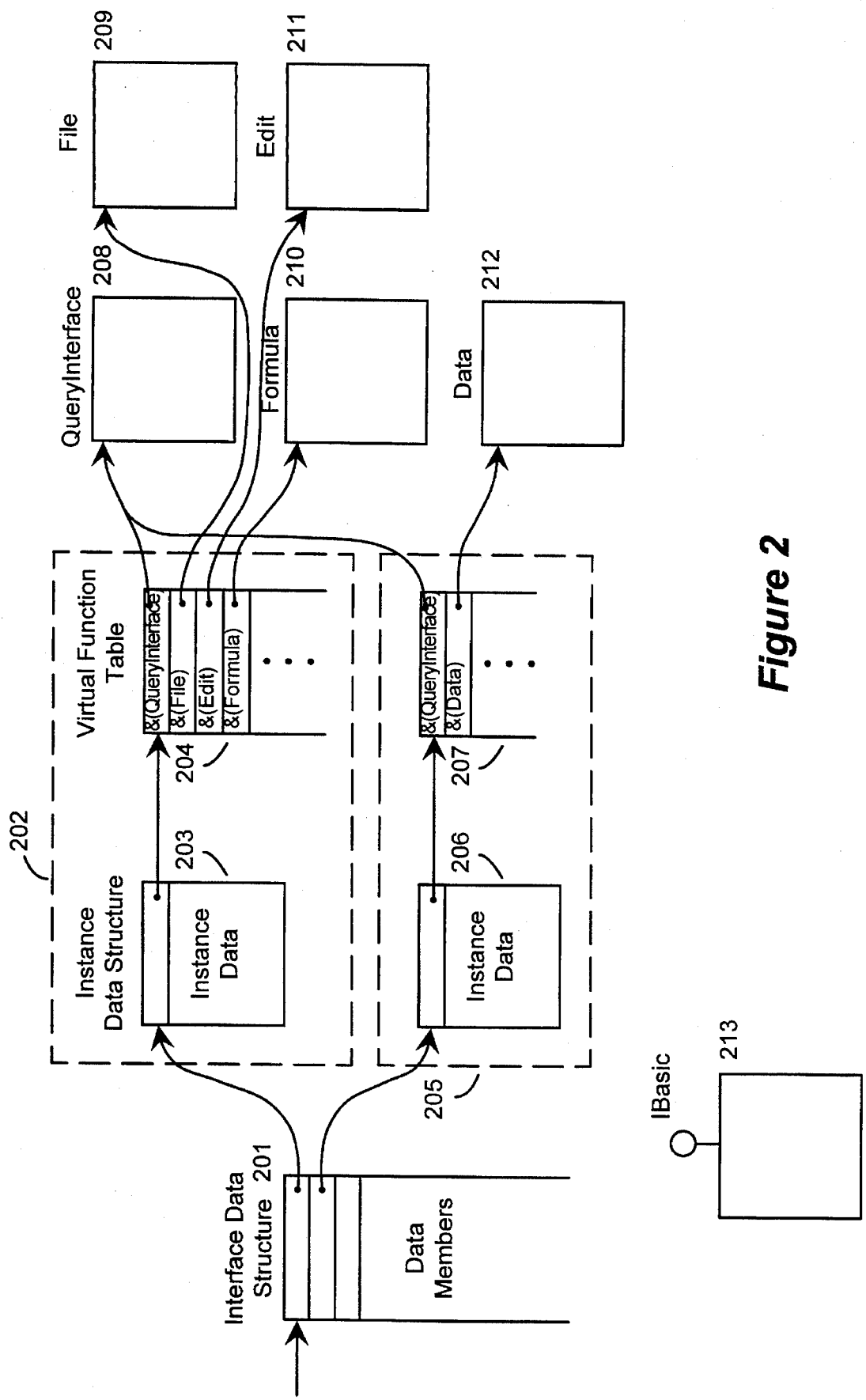
FIG. 2 is a block diagram illustrating a sample data structure of a spreadsheet object.
Figure 3:
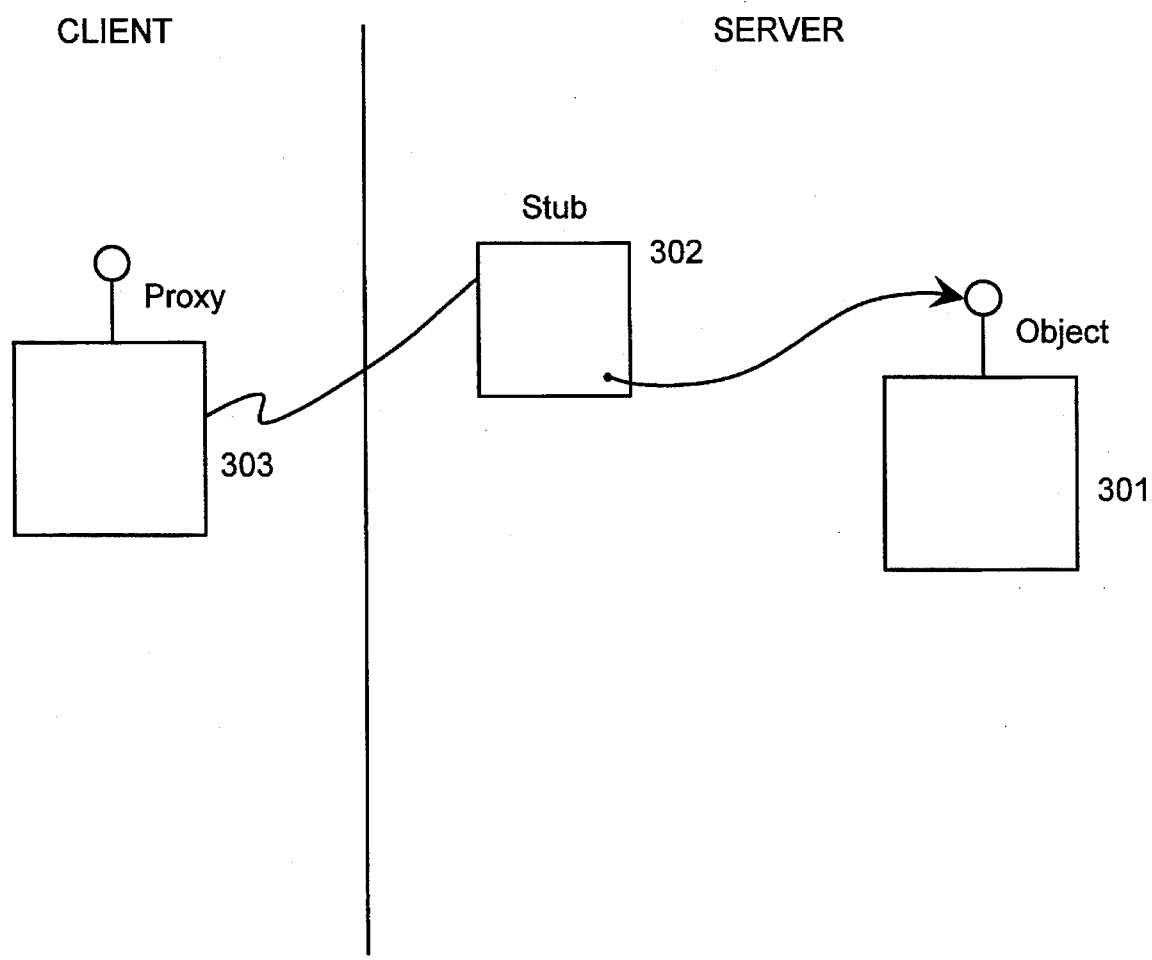
FIG. 3 is a block diagram illustrating the data structures generated and code loaded during marshalling and unmarshalling.

FIG. 3 is a block diagram illustrating the data structures generated and code loaded during marshalling and unmarshalling. The data structures and code include the object 301 and stub object 302 within the server, and proxy object 303 within the client. The proxy 303 and stub 302 are created when a pointer to object 301 is passed to the client. The marshalling process of the server marshals the pointer to an interface of object 301 by loading the code for stub 302, assigning an interprocess communications message address for the stub, storing a pointer to an interface of object 301 within the stub, and packaging the message address of the stub and a class identifier of the proxy into a message. The server then sends the message to the client. When the client receives the message, the client unmarshals the pointer to an interface of object 301 by retrieving the class identifier of the proxy and the stub message address, dynamically loading code to create an instance of the proxy, instantiating proxy 303, and storing the stub message address with the proxy 303. The client then accesses the interface of object 301 through proxy 303.

Proxy 303 is an object that implements the same interface as the interface of object 301, but with a different implementation. Each method of proxy 303 marshals its name and its actual parameters into a message, sends the message to stub 302, waits for a return message from stub 302, and unmarshals any returned parameters. Table 1 lists sample pseudocode for a proxy method named "File."

TABLE 1

```
void File (string Name, int OpenMode, int Status)
    {package "File" into message
     package Name into message
     package OpenMode into message
     send message to stub
     wait for message from stub
     unpackage Status from message
    }
```

Stub 302 is an object that implements an interface that receives messages from the client, unmarshals the method name and any in-parameters, invokes the named method of object 301, marshals any out-parameters into a message, and sends the message to the proxy 303. Table 2 lists sample pseudocode for a stub.

TABLE 2

```
void Stub
    {while (true)
        {wait for message from a client
         unpackage method name
         unpackage any parameters
         invoke named method for the object
         package return parameters
         send message to the client
        }
    }
```

Figure 4A:
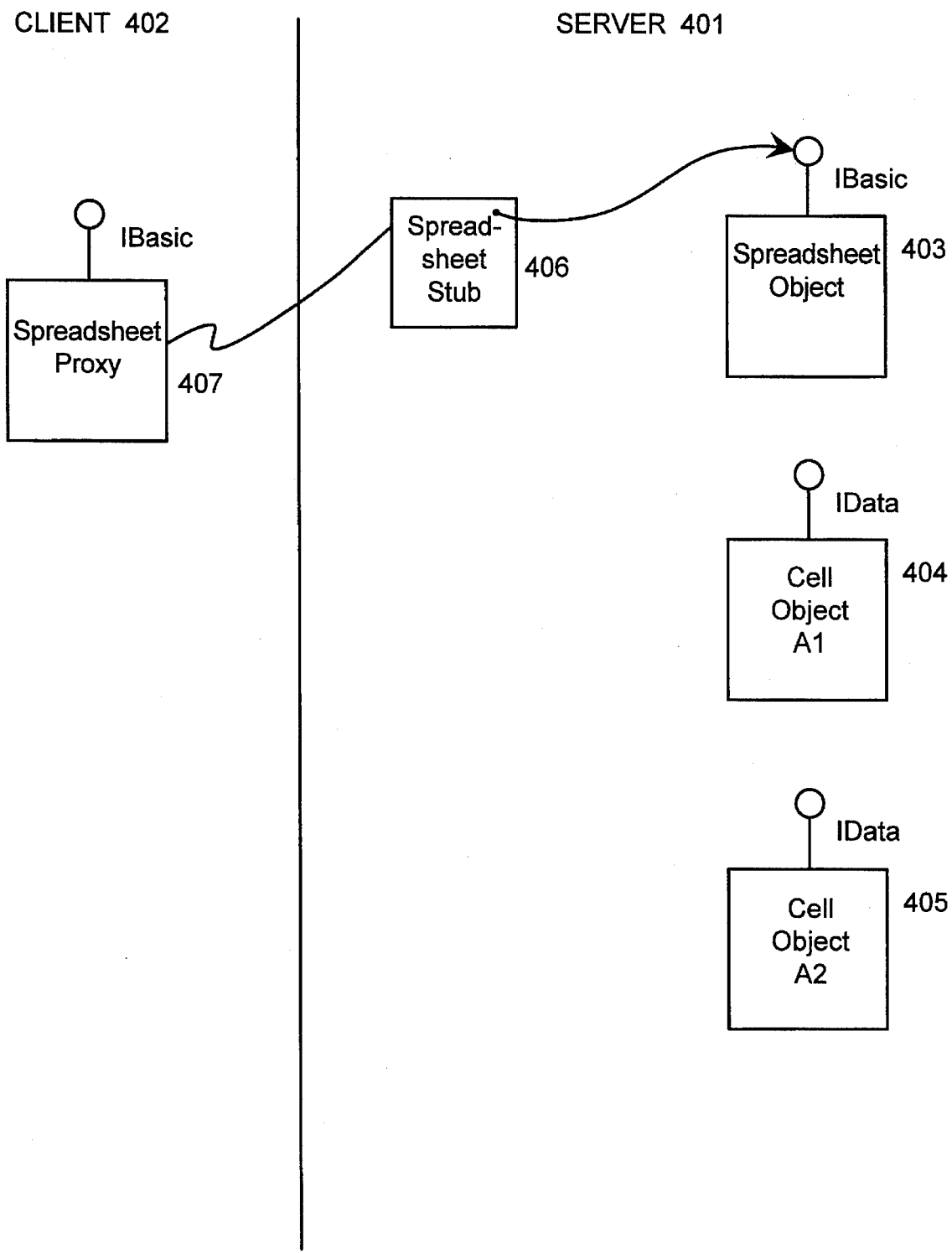
FIGS. 4A through 4C are block diagrams illustrating the marshalling of an interface pointer.
Figure 4B:
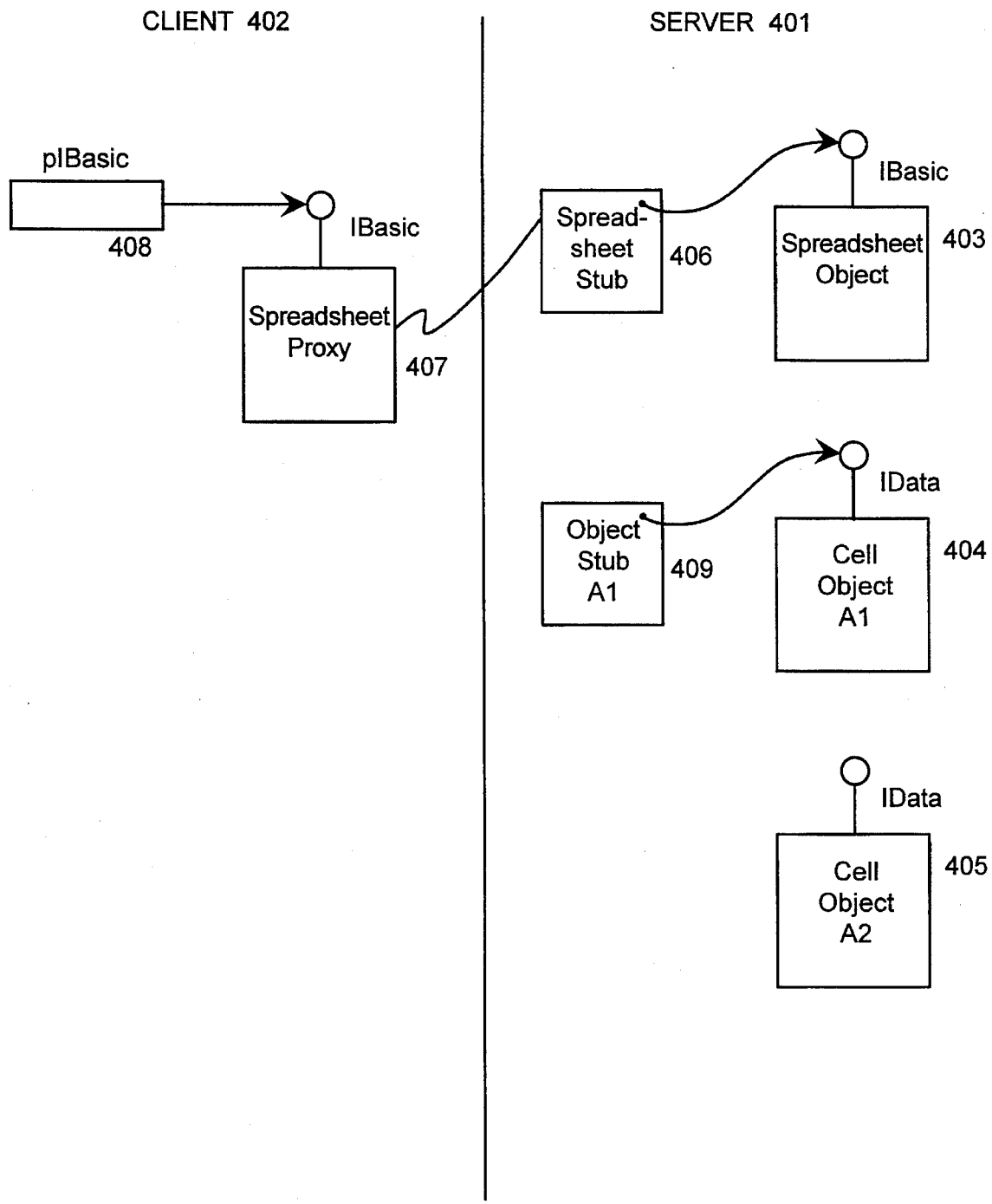
Figure 4C:
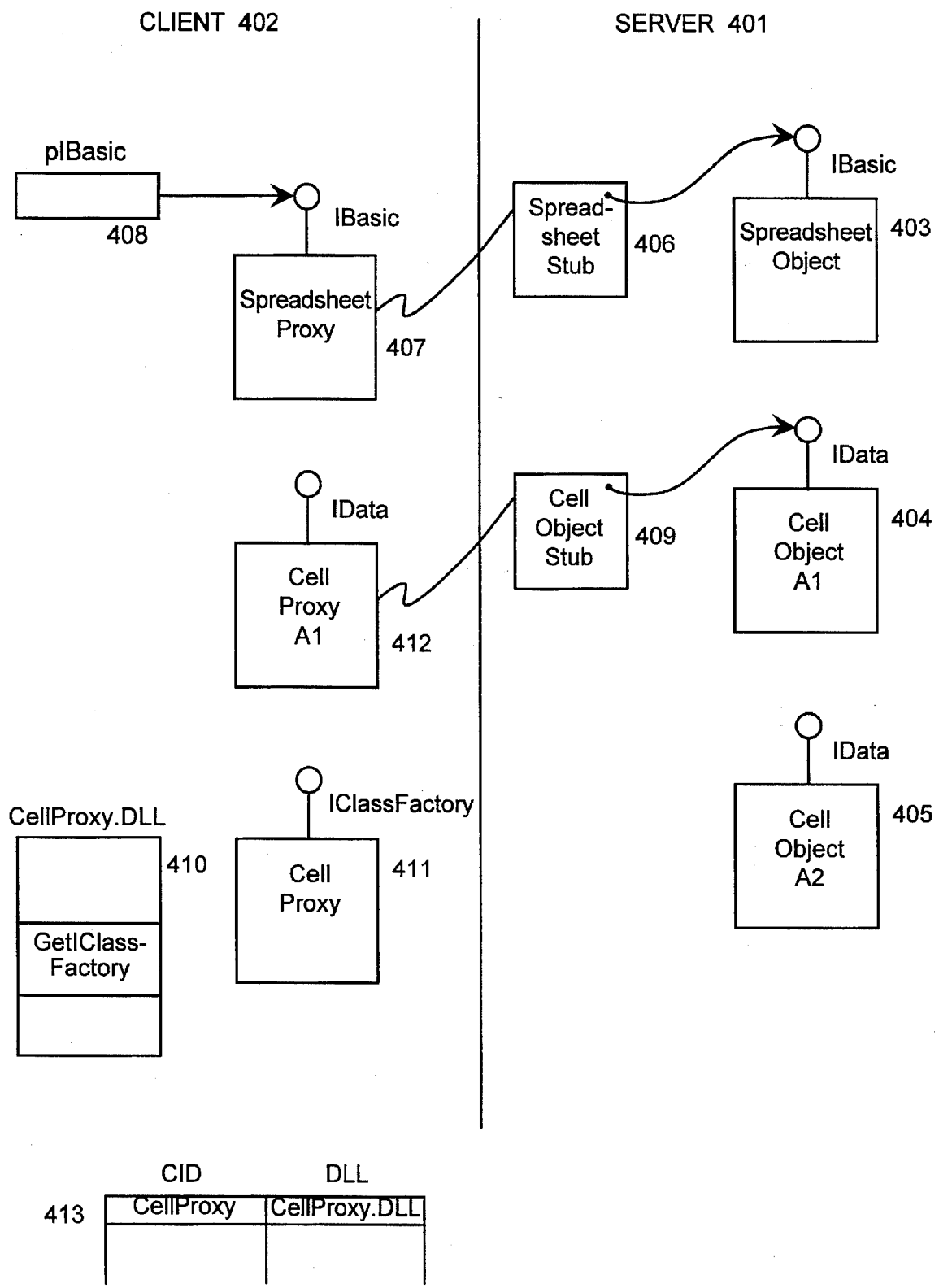

FIGS. 4A through 4C are block diagrams illustrating the marshalling of an interface pointer. Server 401 contains spreadsheet object 403, cell object 404, and cell object 405. Spreadsheet object 403 has an implementation of the IBasic interface. The method GetCell of the IBasic interface is defined by the following prototype.

void GetCell (string RC, cell*pCell)

The method GetCell retrieves a pointer to the cell object representing the cell specified by the passed row/column designator (RC) and returns a pointer to that cell (pCell). The cell objects 404 and 405 have an implementation of the interface IData, which is defined by the following.

```
class IData:IUnknown
    { virtual string GetFormula( );
      virtual void SetFormula(string formula);
      ...
    }
```

The method GetFormula returns the formula value of the cell object as a string, and the method SetFormula sets the formula in the cell object to the passed string.

FIG. 4B is a block diagram illustrating the marshalling of a cell object to the client. When a client wants to retrieve the formula of cell A1 represented as cell object 404, the client executes the following statements.

pIBasic→GetCell("A1", pCell);

formula=pCell→GetFormula();

The spreadsheet proxy 407 is pointed to by pointer pIBasic 408. The client first invokes the spreadsheet proxy method GetCell. The method GetCell packages the method name "GetCell" and the string "A1" into a message and sends the message to spreadsheet stub 406. The spreadsheet stub 406 unpackages the method name and string. The spreadsheet stub 406 then invokes the GetCell method of the spreadsheet object 403. The method GetCell returns to the spreadsheet stub 406 a pointer to cell object 404. The spreadsheet stub 406 then marshals the cell pointer by creating cell stub 409 for cell object 404, assigning a message address to cell stub 409, packaging the message address and an unmarshal class identifier (described below) into a message, and sending the message to the spreadsheet proxy 407. When the spreadsheet proxy 407 receives the message, method GetCell then unmarshals the pointer to the cell object 404.

FIG. 4C is a block diagram illustrating the data structures used during the unmarshalling of a cell pointer. The method GetCell unmarshals the pointer to cell A1 by first retrieving the message address and the unmarshal class identifier ("CellProxy") from the received message. In a preferred embodiment, the persistent registry 413 contains the name of a dynamic link library for each class. Dynamic link libraries are libraries of routines (methods, functions, etc.) that are loaded at run time of a program. Dynamic link libraries are described in the reference "Programming Windows," by Charles Petzold and published by Microsoft Press. Each dynamic link library for a class contains a function GetIClassFactory which returns a pointer to an IClassFactory interface for the class. The method GetCell loads the dynamic link library 410 for the retrieved unmarshal class identifier (the unmarshal class) and invokes the function GetIClassFactory which returns a pointer to the IClassFactory interface 411. The method GetCell then invokes the method CreateInstance of the IClassFactory interface 411 to create cell proxy 412. The cell proxy 412 is then initialized with the retrieved message address for cell stub 409. The method GetCell then returns with the pointer to the cell proxy 412. The client can then access the cell object 404 through the cell proxy 412.

Figure 5:
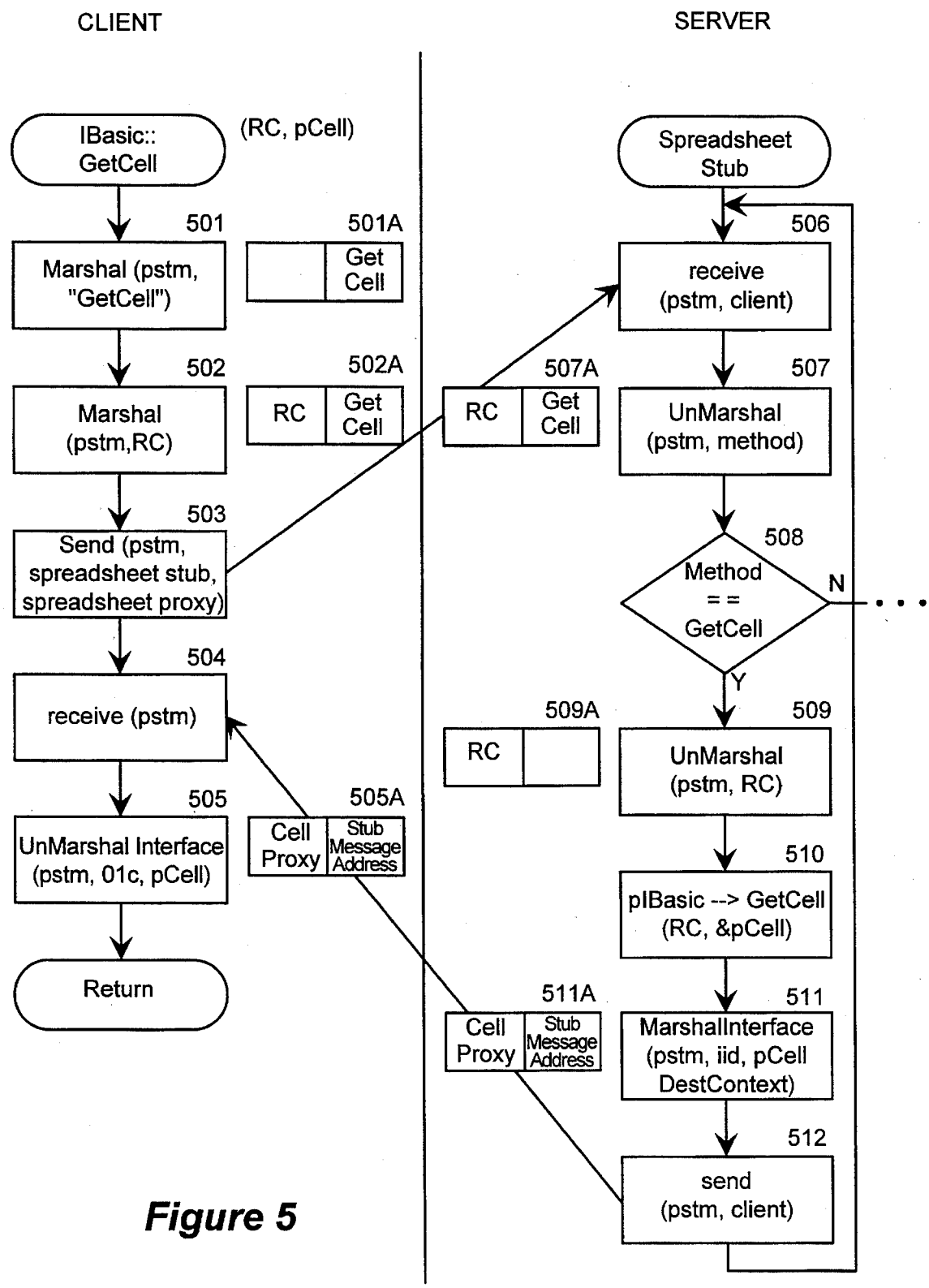
FIG. 5 is a flow diagram illustrating the method GetCell.

FIG. 5 is a flow diagram illustrating the method GetCell. Steps 501 through 505 compose a flow diagram for the method GetCell of the IBasic interface of a spreadsheet proxy. Steps 506 through 512 compose a flow diagram for a spreadsheet stub. The method GetCell marshals the in-parameter, sends the marshalled parameters to the spreadsheet stub, and receives a marshalled pointer to the cell object indicated by the in-parameter. In step 501, the method invokes the function Marshal to marshal the method name (i.e. "GetCell") into the message 501A. The functions Marshal and UnMarshal package and unpackage data into a message. In step 502, the method invokes the function Marshal to marshal the in-parameter RC into the message 502A. In step 503, the method sends the message to the spreadsheet stub. In step 504, the method receives a message from the spreadsheet stub. In step 505, the method invokes function UnMarshalInterface to unmarshal the interface pointer received in message 505A. The method then returns with the pointer pCell pointing to a cell proxy.

In step 506, the stub receives a message sent from a client and the message address of the cell proxy that sent the message. In step 507, the stub invokes function UnMarshal to unmarshal the method name from message 507A. In step 508, if the method name is "GetCell", then the stub continues at step 509, else the stub continues to determine if the method name corresponds to another method of the IBasic interface (as indicated by the ellipsis). In step 509, the stub invokes function UnMarshal to unmarshal the in-parameter designating the cell location from message 509A. In step 510, the stub invokes the method GetCell for the spreadsheet object passing the cell location. The method GetCell returns a pointer to the cell object for the passed location. In step 511, the stub invokes the function MarshalInterface passing it the pointer to the cell object. In step 512, the stub sends the message 511A to the cell proxy that sent the message received in step 506. The stub then loops to step 506 to wait for the next message.

The above-described marshalling techniques are referred to as standard marshalling. In a preferred embodiment, the present invention allows an object to specify how pointers to it are to be marshalled in a process referred to a custom marshalling. Each object that implements custom marshalling provides an implementation of a custom marshalling interface called IMarshal. The IMarshal interface provides function members to marshal and unmarshal an interface pointer. When marshalling and unmarshalling a pointer to an interface, the method QueryInterface of the object is invoked to determine whether the object implements the IMarshal interface. If the object implements the IMarshal interface, then the function members of that interface are invoked to marshal and unmarshal the interface pointer. In FIG. 5, the functions UnMarshalInterface (step 505) and MarshalInterface (step 511) preferably determine if the object implements the IMarshal interface and invokes the function members of the IMarshal interface as appropriate.

FIGS. 6 through 10 are flow diagrams of the methods and functions invoked during the marshalling and unmarshalling of a pointer to a cell object. As described below, these methods and functions implement standard marshalling.

Figure 6:
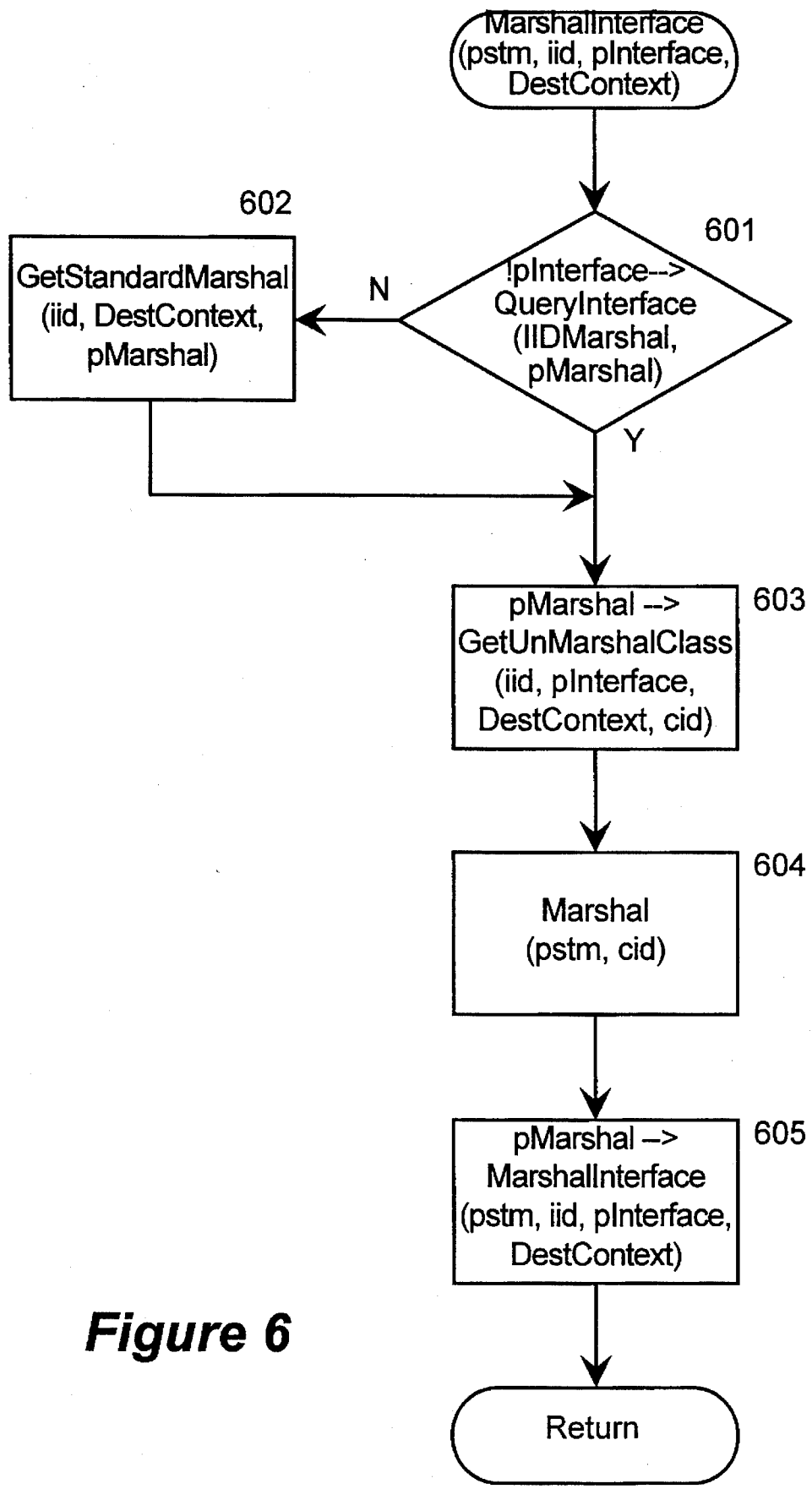
FIG. 6 is a flow diagram of the function MarshalInterface.

FIG. 6 is a flow diagram of the function MarshalInterface. The function has the following prototype.

void MarshalInterface (pstm, iid, pInterface, DestContext)

This function marshals the designated pointer (pInterface) to an interface for an object into the designated message (pstm). In step 601, the function determines whether the object implements custom marshalling. The function invokes the method QueryInterface of the interface to retrieve a pointer to an IMarshal interface. If the object implements custom marshalling, then a pointer (pMarshal) to the IMarshal interface for the object is returned and the function continues at step 603, else the function continues at step 602. In step 602, the function invokes the function GetStandardMarshal to retrieve a pointer (pMarshal) to an IMarshal interface with default marshalling methods. In step 603, the function invokes the method IMarshal::GetUnmarshalClass pointed to by the retrieved pointer. The method GetUnmarshalClass returns the class identifier of the class that should be used in the unmarshalling process to instantiate a proxy for the designated interface (iid). In step 604, the function invokes the function Marshal to marshal the unmarshal class identifier to the designated message. In step 605, the function invokes the method IMarshal::MarshalInterface pointed to by the retrieved pointer (pMarshal). The method MarshalInterface marshals the designated interface pointer (pInterface) to the designated message. The method then returns.

Figure 7:
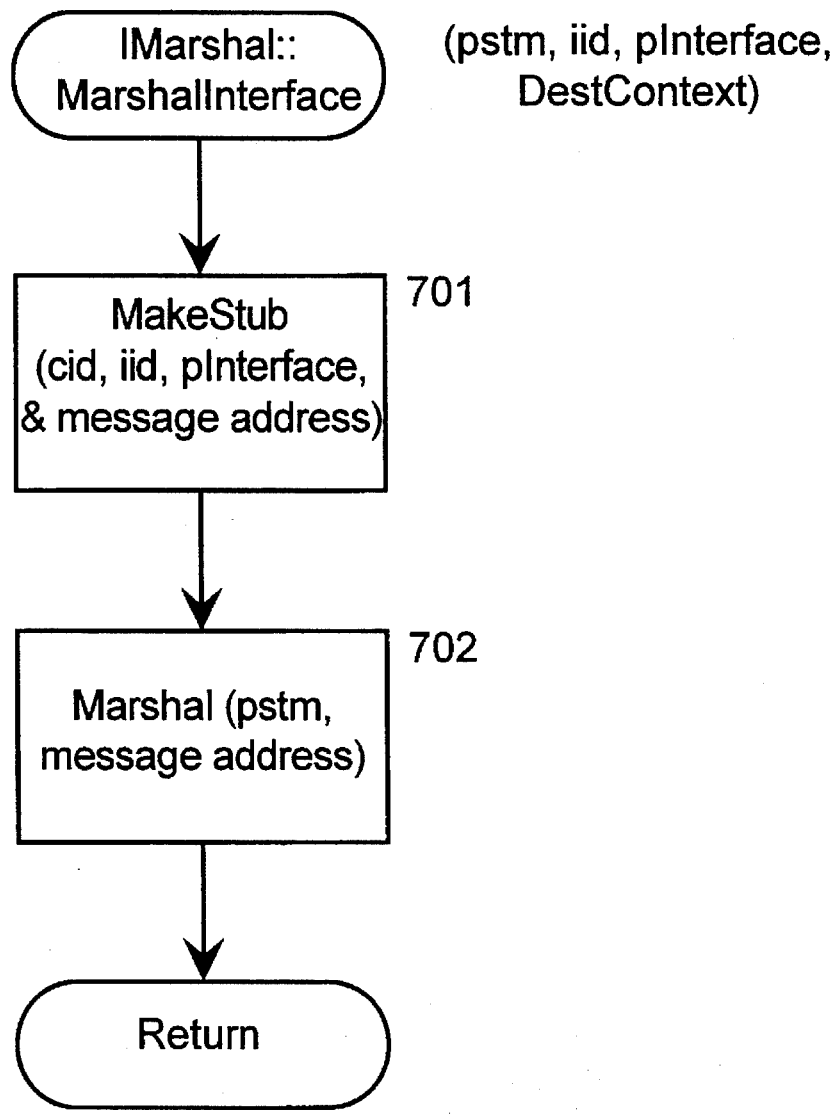
FIG. 7 is a flow diagram of a sample implementation of the method MarshalInterface.

FIG. 7 is a flow diagram of a sample standard implementation of the method MarshalInterface. The method has the following prototype.

void IMarshal::MarshalInterface (pstm, iid, pInterface, DestContext)

The method MarshalInterface marshals the designated pointer to an interface (pInterface) to the designated message (pstm). In step 701, the method invokes function MakeStub. The function MakeStub makes a stub for the designated pointer to the interface and returns the message address of the stub. In step 702, the method invokes the function Marshal to marshal the returned message address in the designated message. The method then returns.

Figure 8:
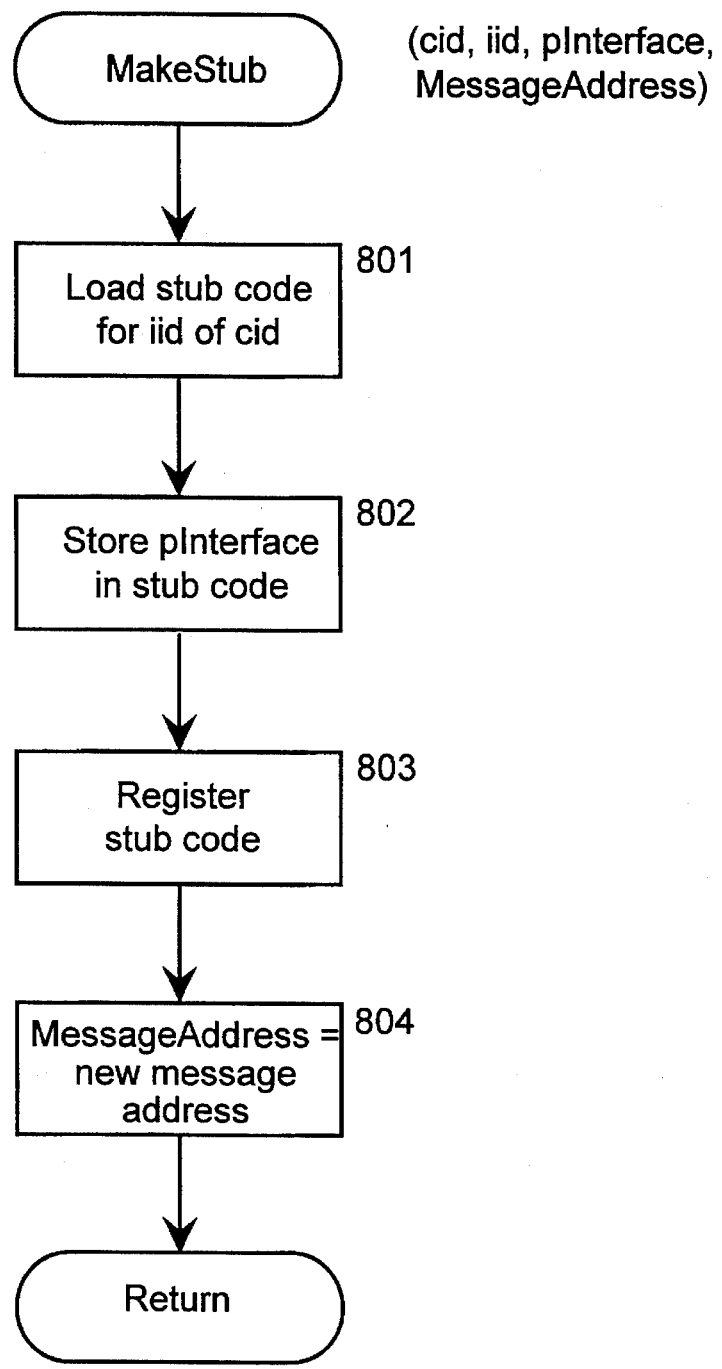
FIG. 8 is a flow diagram of the function MakeStub.

FIG. 8 is a flow diagram of the function MakeStub. The function has the following prototype.

void MakeStub (cid, iid, pInterface, MessageAddress)

The function MakeStub makes a stub for the designated pointer (pInterface) to the designated interface (iid) and returns the message address (MessageAddress) of the stub. In step 801, the function loads a copy of the stub code for the designated interface. In step 802, the function stores the designated pointer to the interface so that it is accessible to the stub code. The storing of the pointer associates the stub code with the object pointed to by the designated pointer. In step 803, the function registers the stub code with the messaging system. The messaging system returns the message address of the stub. In step 804, the function stores the message address to return to the caller. The function MakeStub then returns.

Figure 9:
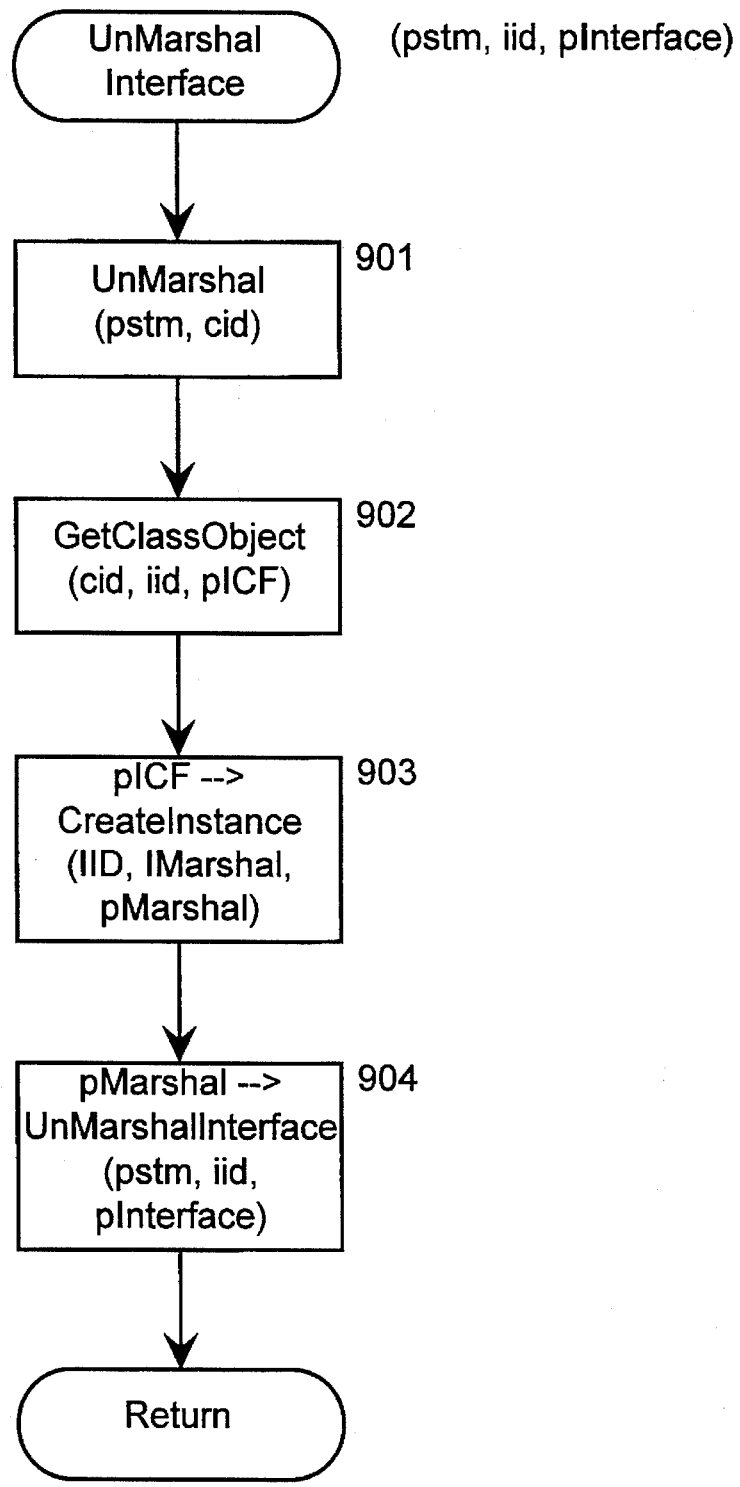
FIG. 9 is a flow diagram of the function UnMarshalInterface.

FIG. 9 is a flow diagram of the function UnMarshalInterface. The function has the following prototype.

void UnMarshalInterface (pstm, iid, pInterface)

The function UnMarshalInterface unmarshals a pointer to an interface that was previously marshalled in the designated message (pstm) and returns a pointer (pInterface) to the designated interface (iid) of the object. In step 901, the function invokes function UnMarshal to unmarshal the unmarshal class identifier from the designated message. In step 902, the function invokes function GetClassObject to retrieve an IClassFactory interface for the class indicated by the unmarshal class identifier (the unmarshal class). In step 903, the function invokes the method CreateInstance of the retrieved IClassFactory interface to create an instance of the proxy and returns a pointer to its IMarshal interface. In step 904, the function invokes method UnMarshalInterface of the proxy. The function UnMarshal then returns.

Figure 10:
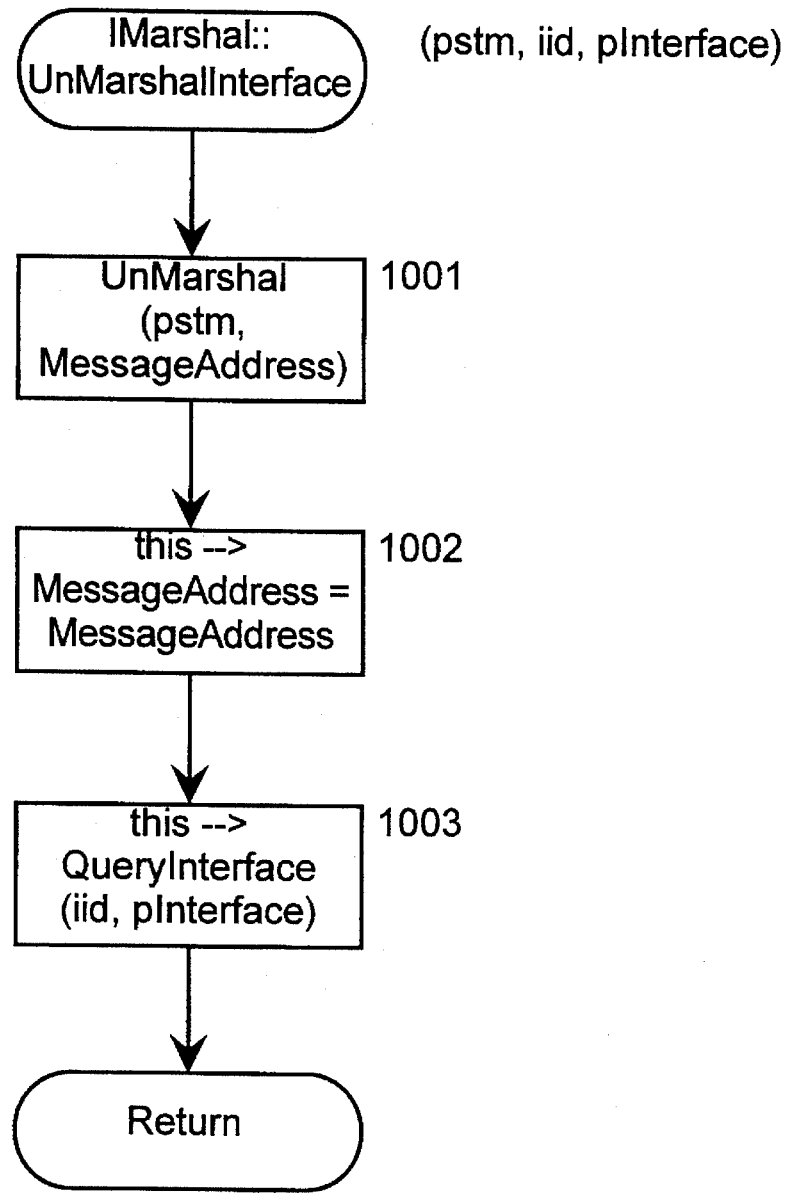
FIG. 10 is a flow diagram of a sample implementation of the method UnMarshalInterface of the IMarshal interface.

FIG. 10 is a flow diagram of a sample implementation of the method UnMarshalInterface. The method has the following prototype.

void IMarshal::UnMarshalInterface (pstm, fFirst, iid, pInterface)

The method UnMarshalInterface initializes the newly created proxy and returns a pointer (pInterface) to the designated interface (iid). In step 1001, the method invokes function UnMarshal to unmarshal the stub message address from the designated message. In step 1002, the method stores the stub message address. In step 1003, the method retrieves a pointer to the designated interface. The method UnMarshalInterface returns.

Figure 11:
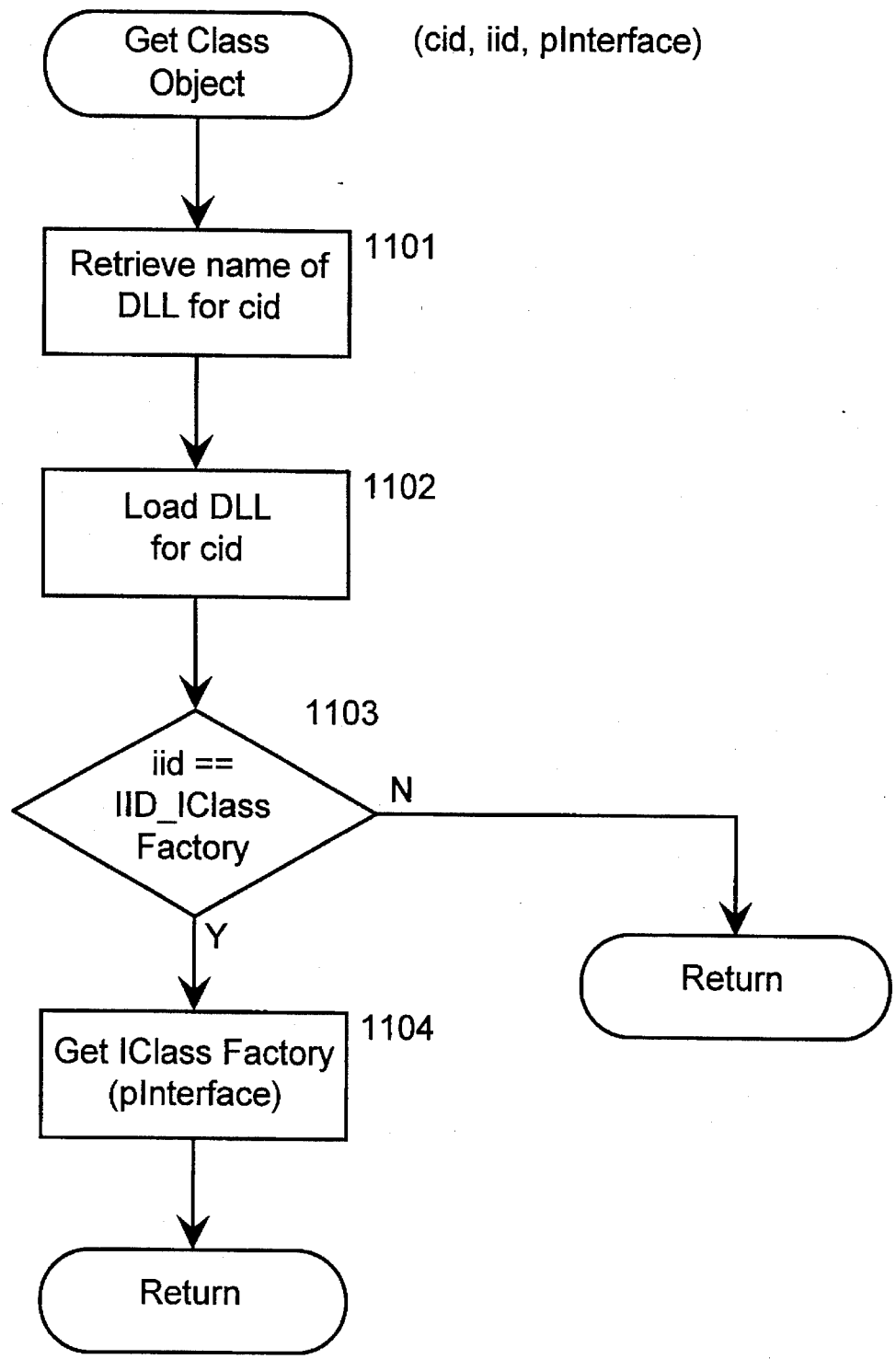
FIG. 11 is a flow diagram of the function GetClassObject.

FIG. 11 is a flow diagram of the function GetClassObject. The function has the following prototype.

void GetClassObject (cid, iid, pInterface)

The function GetClassObject returns a pointer (pInterface) to the designated interface (iid) of the designated class (cid). In step 1101, the function retrieves the name of the dynamic link library for the designated class from the persistent registry. In step 1102, the function loads the dynamic link library. In step 1103, it the designated interface is the IClassFactory, the function continues at step 1104, else the function returns. In step 1104, the function invokes the function GetIClassFactory to get the pointer to the IClassFactory interface. The function GetIClassFactory is preferably provided by the developer of the object. The function GetClassObject then returns.

stub 1202 receives the message, unmarshals the parameters, and invokes the appropriate method of cell object 1201. When the method returns, cell stub 1202 marshals any out-parameters and sends a message to cell proxy 1203. When cell proxy 1203 receives the message, the proxy method unmarshals the parameters and returns to its caller, cell proxy stub 1204. Cell stub 1204 marshals and out-parameters and sends a message to cell proxy 1205. When cell proxy 1205 receives the message, the proxy method unmarshals the parameters and returns to its caller. Thus, whenever process P3 accesses the cell object 1201, the access is routed through process P2.

FIG. 12B shows an optimization resulting from custom marshalling. In FIG. 12B, when process P3 accesses cell object 1201, the access is not routed through process P2 but rather is routed directly to process P1. To achieve this optimization, the IMarshal interface for a cell proxy is implemented with custom marshalling. The method IMarshal::MarshalInterface is implemented as shown by the following pseudocode.

```
void IMarshal::MarshalInterface (pstm, iid, pInterface, DestContext)
    { Marshal (pstm, this->MessageAddress);
    }
```

A developer of an object can provide an implementation of the IMarshal interface to provide custom marshalling and unmarshalling for the object. The IMarshal interface is defined in the following.

As discussed above, the standard IMarshal::MarshalInterface creates a stub and sends the message address of the stub. However, the custom IMarshal::MarshalInterface simply sends the message address of the stub to which it commu-

```
class IMarshal: IUnknown
    { virtual void GetUnmarshalClass (iid, pInterface, DestContext, cid) = 0;
      virtual void MarshalInterface(pstm, iid, pInterface, DestContext) = 0;
      virtual void UnMarshalInterface(pstm, iid, pInterface) = 0;
    }
```

A developer may implement custom marshalling to optimize the marshalling process for both intra-node and inter-node marshalling. FIGS. 12A and 12B are block diagrams illustrating custom marshalling of interface pointers. FIG. 12A shows the effects of standard marshalling. In FIG. 12A, cell object 1201 in process P1 has been marshalled to process P2 as represented by cell stub 1202 and cell proxy 1203. Cell proxy 1203 has been marshalled to process P3 as represented by cell stub 1204 and cell proxy 1205. Cell proxy 1203 was marshalled using the standard marshalling of the type shown in FIG. 7. When process P3 invokes a proxy method of cell proxy 1205, the proxy method marshals the parameters and sends a message to cell stub 1204. Cell stub 1204 receives the message, unmarshals the parameters, and invokes the appropriate proxy method of cell proxy 1203. The proxy method of cell proxy 1203 marshals the parameters and sends a message to cell stub 1202. Cell nicates. Thus, when the custom IMarshal::MarshalInterface of cell proxy 1203 is invoked, the message address of cell stub 1202 is sent to process P3, along with the unmarshal class identifier (CellProxy). When process P3 initializes cell proxy 1205 using the standard unmarshalling method, it stores the message address of cell stub 1202. Thus, when process P3 access cell object 1201, it bypasses process P2.

Figure 13:
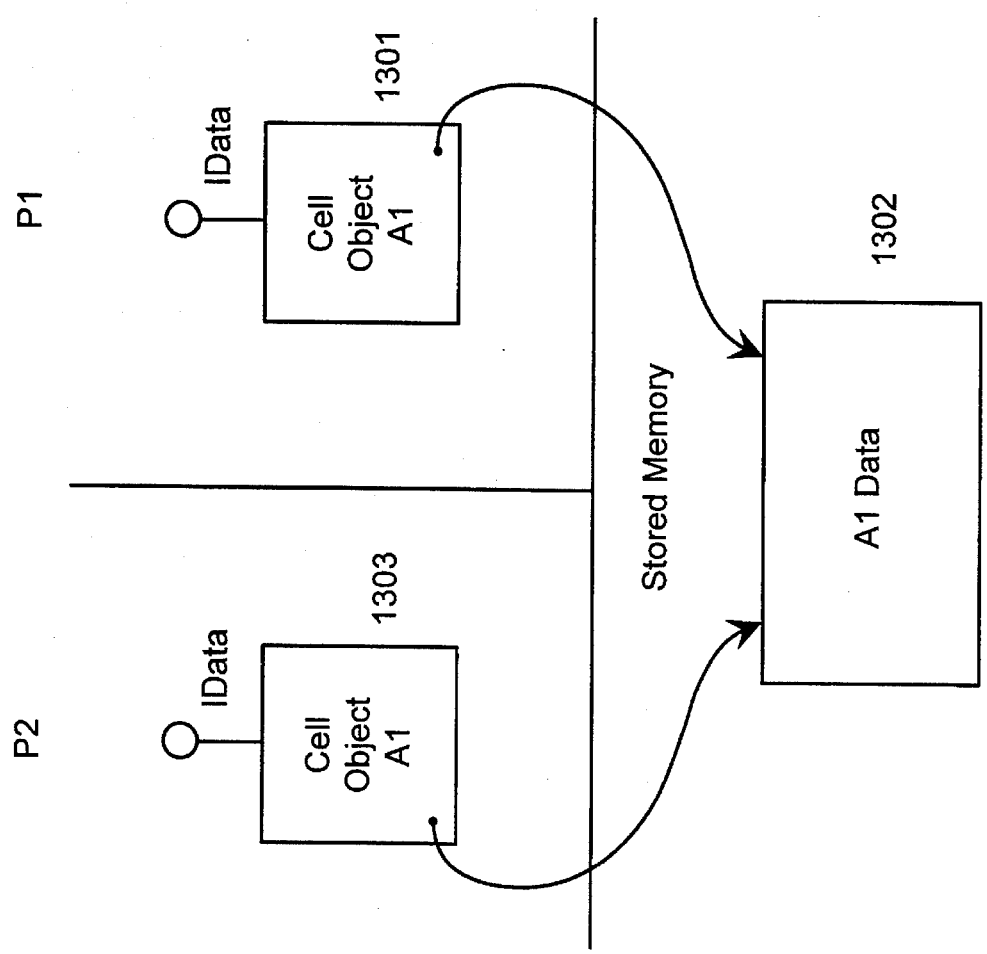
FIG. 13 is a block diagram illustrating custom marshalling with shared memory.

FIG. 13 is a block diagram illustrating custom marshalling with shared memory. In certain situations, an object may store its data members in memory that is shared across processes to avoid the overhead of remote procedure calling to access the data members. In FIG. 13, the data 1302 for cell object 1301 is stored in shared memory. Cell object 1303 is created when a pointer to cell object 1301 is marshalled and sent from process P1 to process P2. The custom methods of the IMarshal interface for a cell object are implemented by the following pseudocode.

```
void IMarshal::MarshalInterface (pstm, iid, pInterface, DestContext)
    { if (DestContext == Shared) then
          { Marshal (pstm, address of data);}
      else
          { MakeStub ("Cell", iid, pInterface, &MessageAddress);
            Marshal (pstm, MessageAddress)};
    }
```

-continued

```
void IMarshal::GetUnmarshalClass (iid, pInterface, DestContext, cid)
    { if (DestContext == Shared)
            {cid = "Cell"}
      else
            {cid = "CellProxy"}
    }
void IMarshal::UnMarshalInterface (pstm, iid, pInterface);
    { UnMarshal (pstm, address of data);
      initialize object to point to shared data
    }
```

The parameter DestContext of the method IMarshal::MarshalInterface indicates whether the data of the cell object is stored in shared memory. If the data is not stored in shared memory, then the equivalent of the standard marshalling is performed. If, however, the data is stored in shared memory, then the address of the shared data is marshalled into the message. The method IMarshal::GetUnmarshalClass determines the unmarshal class based on whether the data is in shared memory. It the data is not in shared memory, then the CellProxy class is the unmarshal class. If the data is in shared memory, then the Cell class is the unmarshal class. The unmarshal class and address of the shared data are sent to process 12. After process P2 instantiates the cell object 1303, the process P2 invokes the custom method IMarshal::UnMarshalInterface, which unmarshals the address of the shared data and initializes the object to point to the data.

Custom marshalling can be used to provide more efficient access to immutable objects. An immutable object is an object whose data members (state) cannot be changed. When an interface pointer to an immutable object is passed from one process to another, custom marshalling can be used to make a copy of the object in the other process. Thus, when the other process accesses the object, it accesses the local copy and no interprocess communication is needed. To allow copying of immutable objects, the methods of the IMarshal interface of the immutable objects are implemented in the following way. In a preferred embodiment, the method IMarshal::GetUnMarshallClass specifies that the unmarshal class is the same class as the class of the immutable object. This ensures that the same type of object is instantiated by the other process. The method IMarshal::MarshalInterface stores the data members of the immutable object into a message for passing to the other process. The method IMarshal::MarshalInterface creates no stub. When the other process receives the message, the other process creates an object of the class of the immutable object. The method IMarshal::UnMarshalInterface then retrieves the data members from the message and initializes the newly-created object. The other process can then access the immutable object.

INTER-NODE MARSHALLING—OVERVIEW

Figure 14:
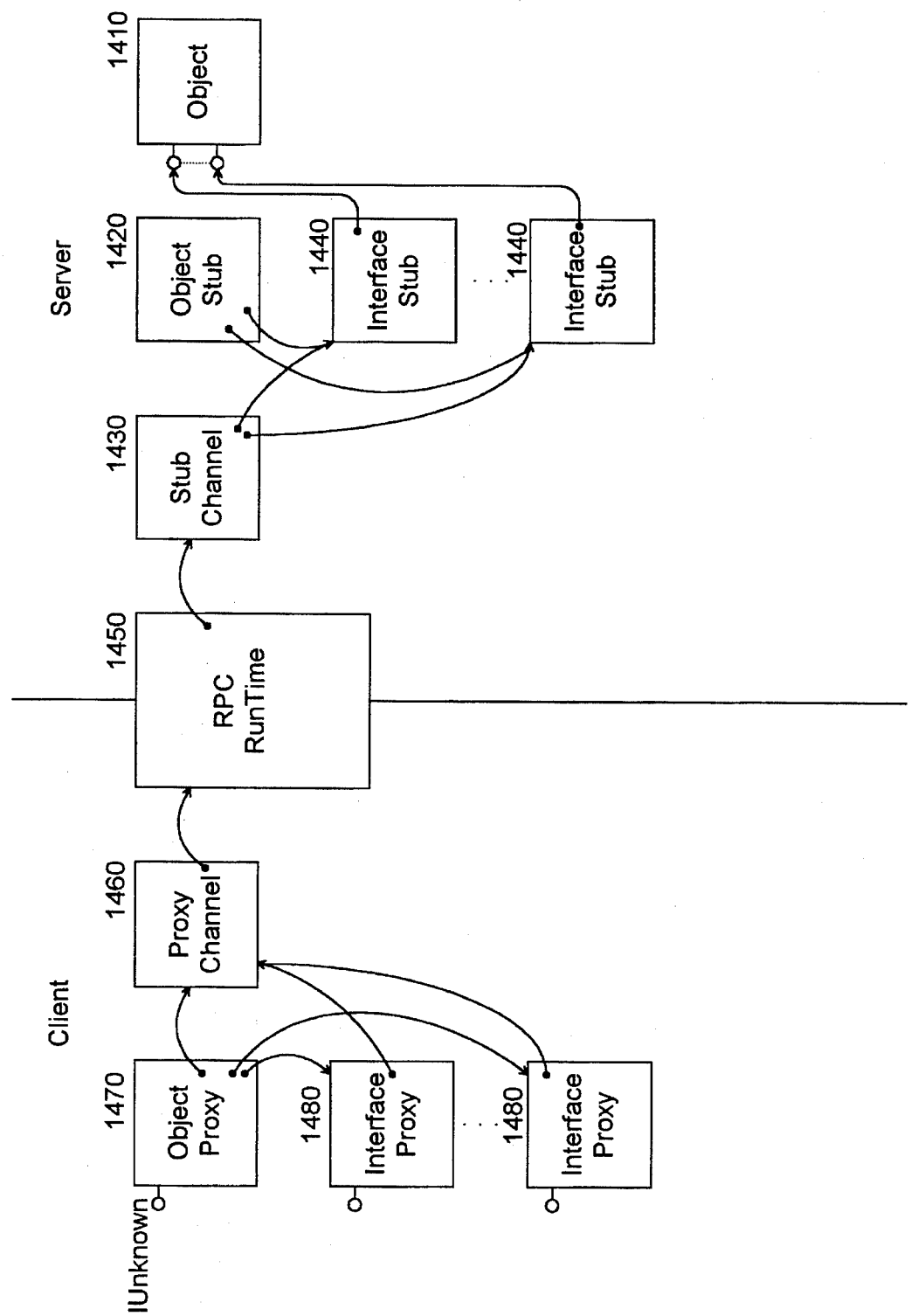
FIG. 14 is a diagram illustrating data structures for network marshalling of interface pointers.

FIG. 14 is a diagram illustrating data structures supporting inter-node marshalling of interface pointers on a computer network. When the client and server execute on different computers (nodes) in a network, then inter-node marshalling is used. As shown in FIG. 14, the object 1410 has interfaces that have been marshalled to the client.

The client contains an object proxy 1470, interface proxies 1480, and a proxy channel 1460 corresponding to the object 1410. For each object that has an interface marshalled, the client contains one object proxy, one proxy channel, and, for each marshalled interface, one interface proxy. The object proxy implements the IUnknown interface for the marshalled object and contains information identifying the interface proxies. In the following, the term "marshalled object" is used to describe an object that has one of its interfaces marshalled. The object proxy is independent of the class of the marshalled object, and thus one class of object proxy can be used for any marshalled object. Each interface proxy provides an implementation for each method of an interface of the object. The interface proxy methods marshal the method name and the parameters, direct the proxy channel to send the marshalled data to the server, and unmarshal any return parameters. In a preferred embodiment, the interface proxies are aggregated into the corresponding object proxy. (Object aggregation is described in "Method and System for Aggregating Object," U.S. Ser. No. 07/996,552, filed on Dec. 24, 1992, which is hereby incorporated by reference.) Each object proxy has a corresponding proxy channel that controls the communications with the server. The proxy channel encapsulates all processing and data needed to support inter-node network communications. Thus, the object proxy and the interface proxies are independent of the particular communications protocol implemented by the proxy channel.

The server contains an object stub 1420, interface stubs 1440, and an stub channel 1430 corresponding to the object 1410. For each marshalled object, the server contains one object stub, one stub channel, and, for each marshalled interface, one interface stub. The object stub manages the tracking of the interface stubs and, like the object proxy, is independent of the class of the marshalled object. Each interface stub waits for a message from a client, unpackages the message, invokes the corresponding method for the interface, packages return parameters, and sends the return parameters to the client via the stub channel. Each object stub has a corresponding stub channel that controls the communications with the client. The stub channel encapsulates all processing and data needed to support network communications. Thus, the object stub and the interface stubs are independent of the particular communications protocol implemented by the stub channel. In a preferred embodiment, the remote procedure call (RPC) runtime code 1450 manages the network communications. The RPC runtime delivers messages to network addresses and informs connected nodes when a problem occurs.

When a client invokes a method of an interface proxy, the method retrieves a buffer from the proxy channel and stores its interface identifier, the method name, and the input parameters into the buffer. The method then directs the proxy channel to send the buffer. The proxy channel directs the RPC runtime to transmit the buffer to the server to which it is connected. When the server receives the buffer, the RPC runtime retrieves information to identify the server process and stub channel within the server process. The RPC runtime then invokes a method of the stub channel to process the buffer. The stub channel unmarshals the interface identifier and identifies the corresponding interface stub for the identified interface. The stub channel then sends the buffer to the identified interface stub. The interface stub unmarshals the method name and the parameters and invokes the corresponding method of the interface of the marshalled object. Upon return, any parameters to be returned to the client are marshalled and sent to the client.

Figure 15:
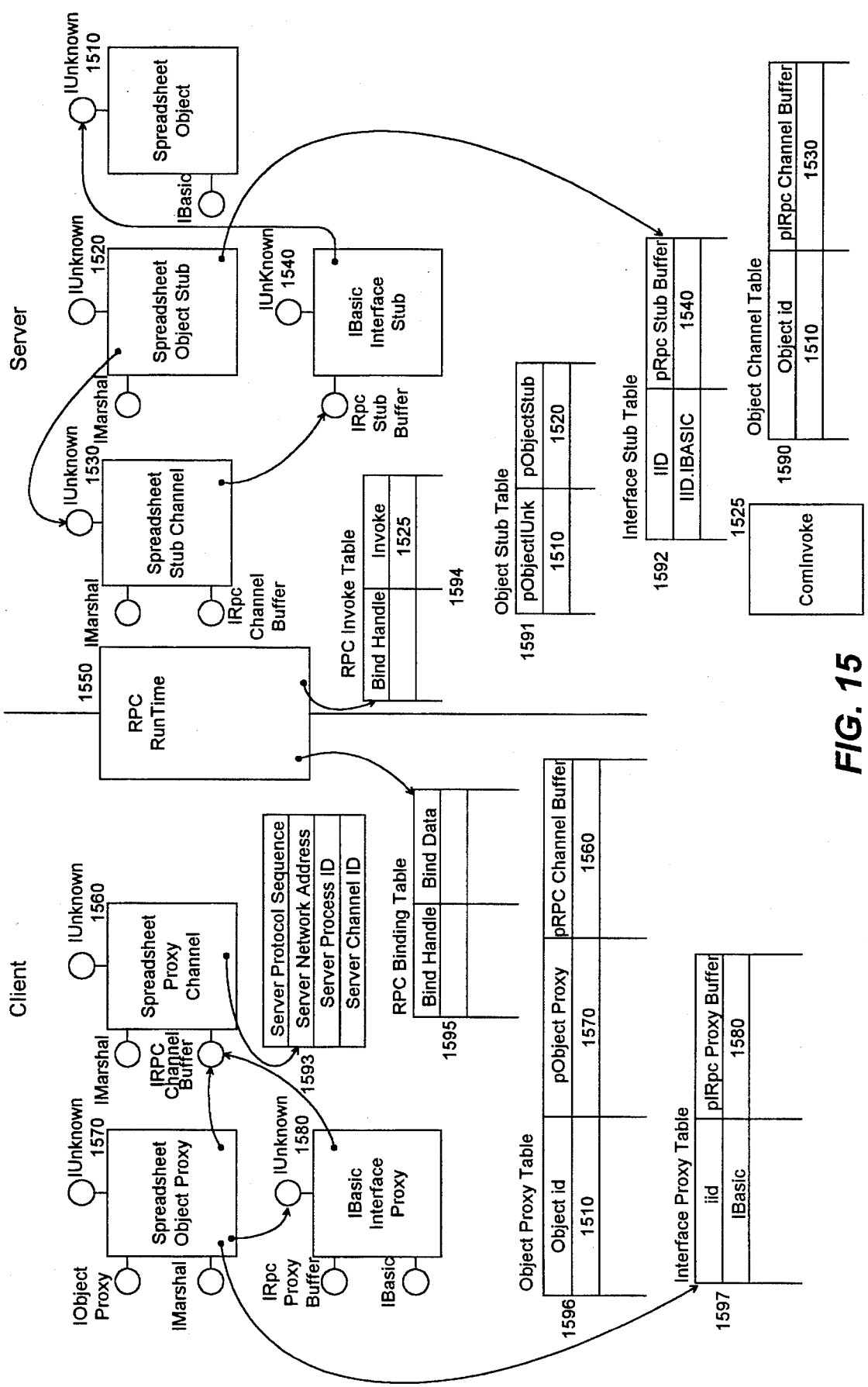
FIG. 15 is a diagram illustrating data structures for network marshalling of a sample interface.

FIG. 15 is a diagram illustrating data structures supporting the marshalled IBasic interface. The spreadsheet object 1510 as discussed above supports the IBasic interface. The server data structures include a spreadsheet object stub 1520, an IBasic interface stub 1540, a spreadsheet stub channel 1530, and a COMInvoke procedure 1525. The spreadsheet object stub implements an IMarshal interface; the spreadsheet interface stub implements the IRpcStubBuffer interface; and the spreadsheet stub channel implements the IRpcChannelBuffer interface and the IMarshal Interface. The COMInvoke procedure is invoked to forward a request to the spreadsheet stub channel. The server maintains the ObjectStubTable 1591. The ObjectStubTable maps each object that the server has marshalled to its corresponding object stub. In the example of FIG. 15, the ObjectStubTable indicates that the spreadsheet object 1510 has been marshalled and has the corresponding spreadsheet object stub 1520. Each object stub maintains an InterfaceStubTable 1592. The InterfaceStubTable contains an entry for each interface stub associated with the object stub. In this example, the IBasic interface stub 1540 is associated with the spreadsheet object stub 1520. The RPC runtime for the server maintains a RPCInvokeTable 1594. The RPCInvokeTable maps a bind handle to binding data (protocol sequence, network address, and end point). The RPCInvokeTable contains an entry for each bind handle. In this example, the RPCInvokeTable associates a bind handle for the server with the COMInvoke procedure. The server maintains the ObjectChannelTable 1590. The ObjectChannelTable map object identifiers to stub channels. In this example, the spreadsheet object 1510 is associated with the spreadsheet stub channel 1530. As shown in FIG. 15, the various stub-related objects contain pointers to one another as described below. Although various data structures are described as tables, one skilled in the art would appreciate that other data structures (e.g., linked lists) may also be used.

The client data structures include a spreadsheet object proxy 1570, an IBasic interface proxy object 1580, and a spreadsheet proxy channel 1560. The spreadsheet object proxy implements the IObjectProxy inter/bee; the IBasic interface proxy implements the IRpcProxyBuffor interface and the IBasic interface; the spreadsheet proxy channel implements the IRpcChannelBuffer interface. The client maintains the ObjectProxyTable 1596. The ObjectProxyTable contains an entry, for each object that has been marshalled to the client and its corresponding object proxy. In this example, the ObjectProxyTable contains an entry corresponding to the spreadsheet object 1510 and its spreadsheet object proxy 1570. Each object proxy maintains an InterfaceProxyTable 1597. The InterfaceProxyTable contains an entry corresponding to each marshalled interface of the object. In this example, the InterfaceProxyTable contains an entry for the IBasic interface and the IBasic interface proxy 1580. The proxy channel contains network addressing information 1593 of the corresponding stub channel. The proxy channel uses this network addressing information to route the remote procedure calls to the appropriate stub channel. In this example, the spreadsheet proxy channel 1570 contains the network addressing information of the spreadsheet stub channel 1530. The RPC runtime 1550 of the client maintains the RPCBindingTable 1595. The RPCBindingTable contains an entry for the server process to which the client is connected. The client uses a BindHandle into the RPCBindingTable to identify a server process. Since the binding information of the stub channel is registered with the RPC runtime, the client can be notified when a node to which it is connected goes down or has an error.

INTER-NODE MARSHALLING—REMOTE PROCEDURE CALL

The following pseudocode illustrates typically processing of a proxy method of an interface proxy. The proxy method has the same signature as the corresponding method of the interface of the marshalled object. The proxy method first retrieves a message buffer from the corresponding proxy channel. The message buffer (in-pmsg) contains the server process identifier, the interface identifier, the method name, and a parameter buffer (in-pbuf). The parameters are marshalled into the parameter buffer. The proxy method then stores the interface identifier and the method name into the message buffer. The proxy method then marshals input parameters into the parameter buffer. The proxy method then requests the proxy channel to send the message buffer to the stub channel. The proxy channel typically operates synchronously with the server and waits for the server to complete execution of the method before returning. If the method specifies that parameters are to be output (returned), then the proxy method unmarshals those parameters. The proxy method then frees the input message buffer.

```
IInterfaceProxy::Method(in-parameters, out-parameters)
    { pIRpcChannelBuffer→GetBuffer(in-pmsg)
      put IID into in-msg
      put METHOD into in-msg
      Marshal(in-pbuf, in-parameters)
      pIRpcChannelBuffer→SendReceive(in-pmsg, out-pmsg)
      UnMarshal(out-pmsg, out-parameters)
      IRpcChannel Buffer→FreeBuffer(in-pmsg)
    }
```

The following pseudocode illustrates the processing of the SendReceive method of the IRpcChannelBuffer. The SendReceive method is passed an input message buffer and returns an output message buffer. The SendReceive method appends a channel header into the message buffer and then directs the RPC runtime to send the input message buffer to the corresponding server, which is represented by BindHandle. BindHandle maps to server process binding information. The channel header contains the interface identifier, the object identifier, and a DCE header. A DCE header contains the network address for the server, the server process identifier, and the method name of the COMInvoke method (described below). The SendReceive method then waits to receive an output stream of return parameters from the RPC runtime.

```
IRpcChannelBuffer::SendReceive(in-pmsg, out-pmsg)
    { store information into channel header
      RPCSend(BindHandle, in-pmsg)
      RPCReceive(out-pmsg)
    }
```

The following pseudocode illustrates the COMInvoke procedure, which is invoked by the RPC runtime when it receives a message buffer for the server. The COMInvoke procedure is passed the input message buffer, and returns an output message buffer. The COMInvoke procedure retrieves the object identifier from the input message buffer. The COMInvoke procedure retrieves a pointer to the stub channel for the object identifier from the ObjectChannelTable. The COMInvoke procedure then retrieves a pointer to the IRpcChannelBuffer interface, which is implemented by the stub channel, for the object identifier and then calls the Invoke method of that interface.

```
COMInvoke (in-pmsg)
    { getObjectidfromin-pmsg
      getObjectChannelTable (Objectid, pIRpcChannel Buffer)
      pIRpcChannelBuffer→Invoke (in-pmsg, out-pmsg)
    }
```

The following pseudocode illustrates the Invoke method of the IRpcChannelBuffer interface of the stub channel. The Invoke method is passed an input message buffer and returns an output message buffer. The Invoke method retrieves the interface identifier from the input message buffer. The Invoke method then retrieves a pointer to the interface stub corresponding to the interface identifier from the InterfaceStubTable. The stub channel may include a pointer to the InterfaceStubTable or may access the table indirectly through the object stub. The Invoke method then calls the Invoke method of the interface stub passing the input message buffer. Each interface is preferably defined with an Invoke method. The Invoke method of an interface stub gets the method name from the input message buffer and invokes that method of the interface stub passing the parameter buffer.

```
IRpcChannelBuffer::Invoke(in-pmsg, out-pmsg)
        { getIIDfromin-msg)
          getInterfaceStubTable(IID, pInterfaceStub)
          pInterfaceStub→INVOKE(in-pbuf, out-pbuf)
        }
```

The following pseudocode illustrates a typical method of the InterfaceStub interface. Each method unmarshals the input parameters, retrieves a pointer to the marshalled interface, invokes the method of the marshalled object passing the unmarshalled parameters, and marshals any output parameters into the output message buffer.

```
IInterfaceStub::METHOD(in-pbuf, out-pbuf)
    { UnMarshal(in-pbuf, parameters)
      pInterface→METHOD(parameters)
      Marshal(out-pbuf, parameters)
    }
```

INTER-NODE MARSHALLING—MARSHALLING AN INTERFACE POINTER

In following the marshalling of an interface pointer across a network is described. The network marshalling is implemented as the standard marshalling. An interface pointer is marshalled by invoking the function MarshalInterface as shown in FIG. 6. The function MarshalInterface retrieves the IMarshal interface (either standard or custom) associated with the interface to be marshalled, marshals an unmarshalling class identifier into a stream, and invokes the method MarshalInterface of the IMarshal interface. In the following, the standard network marshalling of an interface pointer is described. The following pseudocode illustrates the method MarshalInterface of the network implementation of the IMarshal interface. The method MarshalInterface is passed a stream, the interface identifier, and a pointer to the interface to be marshalled. The method MarshalInterface first retrieves the pointer to the IUnknown interface corresponding to the object to be marshalled. When the method QueryInterface of an interface is invoked to return a pointer to the IUnknown interface, the method returns a pointer that uniquely identifies an IUnknown interface for the object. Thus, the method QueryInterface of each interface of an object returns the same value as a pointer to the IUnknown interface. The method MarshalInterface then determines whether the ObjectStubTable contains an entry corresponding to the IUnknown interface of the object to be marshalled. If the ObjectStubTable contains such an entry, then an interface for the object to be marshalled has already been marshalled and the object stub already has been created. Otherwise, the MarshalInterface method creates a object stub by calling the function MakeObjectStub, which is described below. The method MarshalInterface then determines whether the interface identifier of the interface to be marshalled is in the InterfaceStubTable. If the InterfaceStubTable contains such an entry, then the interface has already been marshalled and the interface stub already has been created. Otherwise, the method MarshalInterface creates an interface stub by calling the function MakeInterfaceStub, which is described below. When the method MarshalInterface ensures that both an object stub and interface stub exist, it invokes the method Setup of the IRpcChannelBuffer interface of the stub channel, which allows the stub channel to perform any necessary linking to the interface stub. The method MarshalInterface retrieves the IMarshal interface of the object stub and invokes the method MarshalInterface of the IMarshalInterface.

```
NetworkMarshal::MarshalInterface(pstm, iid, pInterface, DestContext)
    { pInterface→QueryInterface(IID_IUnknown, pIUnk)
      if pIUnk is in ObjectStubTable
            getObjectStubTable(pIUnk, pObjectStub)
      else
            MakeObjectStub(pIUnk, pObjectStub)
      endif
      if iid in InterfaceStubTable
            pObjectStub→getInterfaceStubTable(iid, pIRpcStubBuffer)
      else
            MakeInterfaceStub(iid, pInterface, pIRpcStubBuffer)
      endif
      pIRpcChannelBuffer→Setup(iid, pIRpcStubBuffer)
      pObjectStub→QueryInterface(IID_IMarshal, pIMarshal)
      pIMarshal→MarshalInterface(pstm, iid, pInterface, DestContext)
    }
```

The following pseudocode illustrates the function MakeObjectStub. The function MakeObjectStub is passed a pointer to the IUnknown interface of the object to be marshalled, creates an object stub and a stub channel, and returns a pointer to the object stub. The function MakeObjectStub instantiates an instance of the object stub and the stub channel, and stores an entry corresponding to the object and object stub into the ObjectStubTable. The function MakeObjectStub then puts an entry corresponding to the object identifier and channel into the ObjectChannelTable. Since the behavior of the object stub is independent of the implementation of the object, a standard object stub class is used.

```
MakeObjectStub(pIUnk, pObjectStub, pIRpcChannelBuffer)
    { GetClassObject(CLSID_ObjectStub, IID_IClassFactory, pICF)
      pICF→CreateInstance(NULL, IID_IUunknown, pObjectStub)
      GetClassObject(CLSID_ChannelStub, IID_IClassFactory, pICF)
      pICF→CreateInstance(NULL, IID_IRpcChannelBuffer, pIRpcChannelBuffer)
      putObjectStubTable(pIUnk, pObjectStub)
      putObjectChannelTable(Objectid, pIRpcChannelBuffer)
    }
```

The following pseudocode illustrates the function MakeInterfaceStub. The function MakeInterfaceStub is passed the interface identifier and a pointer to the object to be marshalled, and returns a pointer to a newly created interface stub. The function MakeInterfaceStub first retrieves a proxy/stub class identifier for the passed interface identifier. A interface stub and its corresponding interface proxy are preferably instances of the same class, but are created differently. Certain methods of the class support the interface stub behavior and other methods support the interface proxy behavior. The function MakeInterfaceStub creates an instance of the proxy/stub class and retrieves a pointer to an IPSFactory interface, which is used to create an interface proxy and an interface stub. The IPSFactory interface includes a method to create an interface proxy and a method to create an interface stub. The function MakeInterfaceStub invokes the method CreateStub to create the interface stub, retrieves the IRpcStubBuffer interface, and invokes the method Connect of that interface passing a pointer to the IUnknown interface of the object, which allows the interface stub to store a pointer to the object. The function MakeInterfaceStub then stores an entry into the InterfaceStubTable corresponding to the interface to be marshalled.

object stub marshals the object identifier, interface identifier, and channel class identifier into the stream, then forwards the invocation to the method MarshalInterface of the stub channel. The method MarshalInterface of the stub channel marshals a protocol sequence network address, end point of the server, and a channel identifier into the stream. The protocol sequence, network address, and end point are known as the binding data. The method MarshalInterface of the stub channel then registers the IRpcChannelBuffer with the RPC runtime. This registration allows the RPC runtime to locate the appropriate channel when a method of the marshalled interface is invoked. This registration registers the protocols with the RPC runtime and allows the RPC runtime to establish a listener. The marshalling of the class identifier of the stub channel allows the client to select dynamically a proxy channel class that corresponds to the stub channel class. In a preferred embodiment, binding information contains all available protocols that the stub channel supports (e.g., TCP/IP, named pipes, NetBIOS). In this way, the client can select a protocol that is most efficient. For example, if the client happens to be executing on the same node as the server, then the client can select a protocol that is optimized to intra-node remote procedure calls.

```
MakeInterfaceStub(iid, pIUnk, pIRpcInterfaceBuffer)
    { get proxy/stub clsid for iid
      GetClassObject(clsid, IID_IPSFactory, pIPSFactory)
      pIPSFactory→CreateStub(IID_IRpcStubBuffer, pIRpcStubBuffer)
      pIUnk→QueryInterface(iid, pInterface)
      pIRpcStubBuffer→Connect(pInterface)
      putInterfaceStubTable(iid, pIRpcStubBuffer)
    }
```

The following pseudocode illustrates the method MarshalInterface of the IMarshal interfaces of the object stub and the stub channel. The method MarshalInterface of the

```
ObjectStubIMarshal::MarshalInterface(pstm, iid, pInterface, DestContext)
    { Marshal (pstm, Objectid)
      Marshal (pstm, iid)
```

```
        Marshal (pstm, CLSID_Channel)
        pChannelImarshal→MarshalInterface(pstm, iid, pInterface, DestContext)
        }
ChannelIMarshal::MarshalInterface(pstm, iid, pInterface, DestContext)
        { Marshal(pstm, protocol sequence)
        Marshal(pstm, NetworkAddress)
        Marshal(pstm, Endpoint)
        Marshal(pstm, Channelid)
        RPCRegister(NetworkAddress, Processid, Channelid, &IRpcChannelBuffer)
        }
```

The following pseudocode illustrates the Setup method of the IRpcChannelBuffer interface.

```
IRpcChannelBuffer::Setup(iid, pIRpcStubBuffer)
        { RpcServerRegister(iid)
        }
```

INTER-MODE MARSHALLING—UNMARSHALLING AN INTERFACE POINTER in the following the unmarshalling of an interface pointer is described. An interface is unmarshalled by invoking the function UnMarshalInterface as shown in FIG. 9. The function UnMarshalInterface unmarshals the unmarshal class identifier from the stream, creates an instance of that class, and invokes the method UnMarshalInterface of the IMarshalInterface of that instance. The following pseudocode illustrates the method UnMarshalInterface for standard network marshalling. The method UnMarshalInterface invokes a function to make a proxy object, which in turn invokes a function to make an interface proxy.

```
NetworkIMarshal::UnMarshalInterface(pstm, iid, pInterface)
        { MakeObjectProxy(pstm, pObjectProxy, pIRpcChannelBuffer)
        }
```

The following pseudocode illustrates the function MakeObjectProxy. The function MakeObjectProxy is passed a pointer to a stream; creates an object proxy and proxy channel if not already created; and returns a pointer to the object proxy and proxy channel. The function MakeObjectProxy unmarshals the object identifier, interface identifier, and the class of the proxy channel. The function MakeObjectProxy then determines whether the ObjectProxyTable contains an entry for the object identifier. If the ObjectProxyTable contains such an entry, then an object proxy for the identified object has already been created and the entry is retrieved. Otherwise, the function MakeObjectProxy instantiates an object proxy using the standard class identifier for an object proxy and instantiates a proxy channel using the unmarshalled class identifier of the proxy channel. The function MakeObjectProxy then adds an entry to the ObjectProxyTable for the object identifier and newly instantiated object proxy and proxy channel. The function MakeObjectProxy then retrieves the IMarshal interface of the proxy channel and invokes its UnMarshalInterface method.

```
MakeObjectProxy(pstm, pObjectProxy, pIRpcChannelBuffer)
        { UnMarshal(pstm, Objectid)
        UnMarshal(pstm, iid)
        UnMarshal(pstm, CLSID_Channel)
        if Objectid in ObjectProxyTable
                getObjectProxyTable(Objectid, pObjectProxy, pIRpcChannelBuffer)
        else
                GetClassObject(CLSID_ObjectProxy, IID_IClassFactory, pICF)
                pICF→CreateInstance(NULL, IID_ObjectProxy, pObjectProxy)
                GetClassObject(CLSID_channel, IID_IClassFactory, pICF)
                pICF→CreateInstance(NULL, IID_IRpcChannelBuffer, pIRpcChannelBuffer)
                putObjectProxyTable(Objectid, pObjectProxy, pIRpcChannelBuffer)
        endif
        MakeInterfaceProxy(iid, pObjectProxy, pIRpcChannel Buffer)
        pIRpcChannelBuffer→QueryInterface(IID_IMarshal, pMarshal)
        pMarshal→UnMarshalInterface(pstm, iid, pInterface)
        }
```

The following pseudocode illustrates the method UnMarshalInterface of the IMarshal interface of the stub channel. The method UnMarshalInterface unmarshals the binding data from the stream. The RPC runtime generates a bind handle for bound stub channels. If the binding data has not been bound, then the method UnMarshalInterface requests the RPC runtime to bind the unmarshalled binding data.

```
ChannelIMarshal::UnMarshalInterface(pstm, iid, pInterface)
    { UnMarshal(pstm, BindingData)
      If not already bound
          select BindingData
          RPCBinding(BindingData, BindHandle)
          // negotiate binding
      endif
    }
```

The following pseudocode illustrates the function MakeInterfaceProxy. The function MakeInterfaceProxy is passed an interface identifier, the object proxy, and the proxy channel; creates an interface proxy if not already created; and returns a pointer to the interface proxy. The function MakeInterfaceProxy determines whether an entry for the unmarshalled interface identifier is in the InterfaceProxyTable. If the InterfaceProxyTable contains such an identifier, then an interface proxy for the identifier interface has already been created. Otherwise, the MakeInterfaceProxy procedure retrieves the proxy/stub class identifier for the interface identifier and instantiates an interface proxy. The MakeInterfaceProxy procedure then invokes the Connect method of the IRpcProxyBuffer interface to connect the interface proxy to the object channel.

```
MakeInterfaceProxy(iid, pObjectProxy, pIRpcChannelBuffer)
    if iid in InterfaceProxyTable
        getInterfaceProxyTable(iid, pIRpcProxyBuffer)
    else
        get proxy/stub clsid for iid
        GetClassObject(clsid, IID_IPSFactory, pIPSFactory)
        pIPSFactory->CreateProxy(pObjectProxy, IID_IRpcProxyBuffer, pIRpcProxyBuffer)
        pIRpcProxyBuffer->Connect(pIRpcChannelBuffer)
    endif
}
```

INTER-NODE MARSHALLING—THE IUNKNOWN INTERFACE

The object proxy and object stub implement the IUnknown interface for the marshalled object. There is preferably no separate interface proxy or interface stub for the IUnknown interface. The object proxy maintains a reference count for the object proxy. The method AddRef of the IUnknown interface increments the reference count. The method AddRef does not forward its invocation to the server. The method Release of the IUnknown interface decrements the reference count. The method Release does not forward its invocation to the server, unless the reference count is decremented to zero. When the reference count is decremented to zero, the object proxy releases the proxy channel. The proxy channel directs the RPC runtime to release stub channel, which in turn releases the object stub.

The method QueryInterface of the IUnknown interface is forwarded to the server only when the InterfaceProxyTable does not contain an entry for the requested interface. If the marshalled object supports the requested interface, then the server marshals a pointer to the interface and sends it to the client. The client unmarshals the pointer, creates an interface proxy, and stores an entry into the InterfaceProxyTable. If the InterfaceProxyTable already contained an entry, then the method QueryInterface returns a pointer to the interface proxy that is stored in the table.

Although the present invention has been described in terms of preferred embodiments, it is not intended that the invention be limited to these embodiments. Modifications within the spirit of the invention will be apparent to those skilled in the art. The scope of the present invention is defined by the claims that follow.

What is claimed is:

1. A method in a computer system network for passing a pointer to an interface of an object from a server process in one node of the network to a client process in another node of the network to enable the client process to invoke function members of the interface, the method comprising the steps of:

within the server process,
  instantiating the object, the object having an implementation of the interface, the interface having a function member;
  creating an interface stub for receiving a request to invoke the function member of the interface and for invoking the requested function member upon receiving the request;
  creating a stub channel for receiving the request to invoke the function member of the interface and for forwarding the request to the created interface stub; and
  sending an identifier of the stub channel to the client process via network communications; and within the client process,
  receiving the identifier of the stub channel from the server process;
  creating an interface proxy for receiving the request to invoke a function member of the interface and for sending the request to a proxy channel;
  obtaining a pointer to the created interface proxy; and
  creating the proxy channel for receiving the request from the created interface proxy and sending the request to the stub channel identified by the received identifier, whereby the client process may use the pointer to the interface proxy to invoke the function member of the interface of the object instantiated within the server process.

2. The method of claim 1 including the steps of:

within the server process,
  sending an unmarshal class identifier to the client process identifying the class of the interface proxy; and within the client process,
  receiving the unmarshal class identifier from the server process; and
  dynamically loading code to instantiate an object of the class identified by the unmarshal class identifier wherein the step of creating the interface proxy executes the dynamically-loaded code.

3. The method of claim 2 including the step of:

within the client process, retrieving from a persistent registry an indicator identifying code for instantiating an object of the class identified by the received unmarshal class identifier, and wherein the dynamically loading step dynamically loads the code identified by the retrieved indicator.

4. The method of claim 1 including the steps of:
within the server process,
sending an indicator of the class of the proxy channel to the client process; and
within the client process,
receiving the indicator of the class of proxy channel, and wherein the step of creating a proxy channel includes the step of instantiating an object of the class indicated by the received indicator.

5. The method of claim 1 wherein the proxy and stub channels are adapted to receiving requests to invoke a function member of any interface.

6. The method of claim 1 including the step of within the server process, sending a plurality of binding protocols to the client process wherein the client process selects one of the plurality of binding protocols to communicate with the server process.

7. A method in a computer system for passing a pointer to an interface of an object from a server process to a client process to enable the client process to invoke function members of the interface, the method comprising the steps of:
within the server process,
instantiating the object, the object having a plurality of interfaces, each interface having a function member;
identifying an interface of the object to pass to the client process;
creating a stub for receiving a request to invoke the function member of the identified interface and for invoking the function member upon receiving the request, the stub having an identifier; and
sending the identifier of the stub to the client process; and
within the client process,
receiving the identifier of the stub from the server process;
instantiating a proxy object for receiving requests to invoke a function member of the interface and for sending the request to the identified stub; and
obtaining a pointer to the instantiated proxy object,
whereby the client process may use the pointer to the interface proxy to invoke the function member of the interface of the object instantiated within the server process.

8. The method of claim 7 including the steps of:
within the server process,
sending an unmarshal class identifier identifying the class of the proxy object to instantiate in the step of instantiating a proxy object to the client process; and
within the client process,
receiving the unmarshal class identifier from the server process; and
accessing code to instantiate an object of the class identified by the unmarshal class identifier wherein the step of instantiating a proxy object executes the accessed code.

9. The method of claim 8 wherein the accessing step includes the step of selecting earlier loaded code capable of instantiating an object of the class identified by the unmarshal class identifier.

10. The method of claim 8 wherein the accessing step includes the step of dynamically loading code capable of instantiating an object of the class identified by the unmarshal class identifier.

11. The method of claim 8 wherein the accessing step includes the steps of:
if already loaded code is capable of instantiating an object of the class identified by the unmarshal class identifier, selecting the already loaded code; and
if no already loaded code is capable of instantiating an object of the class identified by the unmarshal class identifier, dynamically loading code to instantiate an object of the class identified by the unmarshal identifier.

12. The method of claim 10 or 11 wherein the step of dynamically loading code includes the step of:
within the client process,
retrieving from a persistent registry a persistent registry entry indicator of the code to dynamically load, the persistent registry having an entry associating the unmarshal class identifier with the persistent registry entry indicator.

13. A method in a computer system for passing a pointer to an interface of an object from a server process to a client process to enable the client process to invoke function members of the interface, the method comprising the steps of:
within the server process,
instantiating the object, the object having a plurality of interfaces, each interface having a function member, the object further having a marshalling function member for performing object-specific marshalling for a pointer to one of the plurality of interfaces;
identifying an interface of the object to pass to the client process;
invoking the marshalling function member of the object to marshal the identified interface; and
sending to the client process a reference to the object instantiated within the server process and an unmarshal class identifier identifying the class of the proxy object to be instantiated by the client process; and
within the client process,
receiving from the server process the reference to the object instantiated within the server process and the unmarshal class identifier;
instantiating an object of the class identified by the unmarshal class identifier, the object of the class identified by the unmarshal class identifier having an unmarshalling function member;
obtaining a pointer to the object of the class identified by the unmarshal class identifier: and
invoking the unmarshalling function member of the object of the class identified by the unmarshal class identifier using the obtained pointer and passing the reference to the object instantiated within the server proxy, the unmarshalling function member for performing object-specific unmarshalling for the pointer to the identified interface,
whereby the client process may use the pointer to the object of the class identified by the unmarshal class identifier to invoke a function member of the identified interface of the object instantiated within the server process.

14. The method of claim 13 wherein the step of instantiating an object of the class identified by the unmarshal class identifier includes the step of accessing code to instantiate the object.

15. The method of claim 14 wherein the accessing step includes the step of selecting earlier loaded code capable of instantiating an object of the class identified by the unmarshal class identifier.

16. The method of claim 14 wherein the accessing step includes the step of dynamically loading code capable of instantiating an object of the class identified by the unmarshal class identifier.

17. The method of claim 14 wherein the accessing step includes the steps of:
if already loaded code is capable of instantiating an object of the class identified by the unmarshal class identifier, selecting the already loaded code; and
if no already loaded code is capable of instantiating an object of the class identified by the unmarshal class identifier, dynamically loading code to instantiate an object of the class identified by the unmarshal identifier.

18. The method of claim 16 or 17 wherein the step of dynamically loading code includes the step of:
within the client process,
retrieving from a persistent registry a persistent registry entry indicator of the code to dynamically load, the persistent registry having an entry associating the unmarshal class identifier with the persistent registry entry indicator.

19. A method in a computer system of passing a pointer to an object from a server process to a client process to enable the client process to invoke function members of the object, the method comprising the steps of:
within the server process,
instantiating the object;
creating a stub for receiving a request to invoke a function member of the object and for invoking the requested function member upon receiving the request, the stub having an identifier; and
sending an unmarshal class identifier identifying the class of a proxy object to instantiate within the client process and the identifier of the stub to the client process; and
within the client process,
receiving the unmarshal class identifier and the identifier of the stub from the server process;
accessing code to instantiate the proxy object of the class identified by the unmarshal class identifier; and
executing the accessed code, including the substeps of:
instantiating a proxy object of the class identified by the unmarshal class identifier, and
initializing the proxy object to contain a reference to the identified stub so that when the proxy object receives requests to invoke a function member of the object, the proxy object sends the request to the identified stub; and
obtaining a pointer to the instantiated proxy object, wherein the client process may use the pointer to the proxy object to invoke function members of the object instantiated within the server process.

20. The method of claim 19 wherein the accessing step includes the step of selecting earlier loaded code capable of instantiating an object of the class identified by the unmarshal class identifier.

21. The method of claim 19 wherein the accessing step includes the step of dynamically loading code capable of instantiating an object of the class identified by the unmarshal class identifier.

22. The method of claim 19 wherein the accessing step includes the steps of:
if already loaded code is capable of instantiating an object of the class identified by the unmarshal class identifier, selecting the already loaded code; and
if no already loaded code is capable of instantiating an object of the class identified by the unmarshal class identifier, dynamically loading code to instantiate an object of the class identified by the unmarshal identifier.

23. The method of claim 21 or 22 wherein the step of dynamically loading code includes the step of:
within the client process,
retrieving from a persistent registry a persistent registry entry indicator of the code to dynamically load, the persistent registry having an entry associating the unmarshal class identifier with the persistent registry entry indicator.

24. A method in a computer system of passing a pointer to an object from a server process to a client process to enable the client process to invoke function members of the object, the method comprising the steps of:
within the server process,
instantiating the object, the object having a marshalling function member for performing object-specific marshalling for a pointer to the object;
invoking the marshalling function member of the object to marshal the identified interface; and
sending to the client process a reference to the object instantiated within the server process and an unmarshal class identifier identifying the class of a proxy object to instantiate in the client process; and
within the client process,
receiving from the server process the reference to the object instantiated within the server process and the unmarshal class identifier;
accessing code to instantiate the object of the class identified by the unmarshal class identifier;
executing the accessed code to instantiate an object of the class identified by the unmarshal class identifier, the object of the class identified by the unmarshal class identifier having an unmarshalling function member;
obtaining a pointer to the object of the class identified by the unmarshal class identifier; and
invoking the unmarshalling function member of the object of the class identified by the unmarshal class identifier using the obtained pointer and passing the reference to the object instantiated within the server process, the unmarshalling function member for performing object-specific unmarshalling for the pointer to the object,
whereby the client process may use the pointer to the object of the class identified by the unmarshal class identifier to invoke function members of the object instantiated within the server process.

25. The method of claim 24 wherein the accessing step includes the step of selecting earlier loaded code capable of instantiating an object of the class identified by the unmarshal class identifier.

26. The method of claim 24 wherein the accessing step includes the step of dynamically loading code capable of instantiating an object of the class identified by the unmarshal class identifier.

27. The method of claim 24 wherein the accessing step includes the steps of:
if already loaded code is capable of instantiating an object of the class identified by the unmarshal class identifier, selecting the already loaded code; and
if no already loaded code is capable of instantiating an object of the class identified by the unmarshal class identifier, dynamically loading code to instantiate an object of the class identified by the unmarshal identifier.

28. The method of claim 26 or 27 wherein the step of dynamically loading code includes the step of:

within the client process,
retrieving from a persistent registry a persistent registry entry indicator of the code to dynamically load, the persistent registry having an entry associating the unmarshal class identifier with the persistent registry entry indicator.

29. A method in a computer system for passing a pointer to an object from a server process to a first client process and from the first client process to a second client process to enable the client process to invoke function members of the object, the method comprising the steps of:

within the server process,
instantiating the object;
creating a stub for receiving a request to invoke a function member of the object and for invoking the requested function member upon receiving the request, the stub having an identifier; and
sending an unmarshal class identifier identifying the class of an object to be instantiated in the first and second client processes and the identifier of the stub to the first client process;

within the first client process,
receiving the unmarshal class identifier and the identifier of the stub from the server process;
accessing code to instantiate a first proxy object of the class identified by the unmarshal class identifier;
executing the accessed code, including the substeps of:
instantiating a first proxy object of the class identified by the unmarshal class identifier and having a marshalling function member to specify that the identifier of the stub is to be sent to the second client process, and
initializing the first proxy object to contain a reference to the identified stub so that when the first proxy object receives requests from the first client process to invoke a function member of the object, the first proxy object sends the request to the identified stub;
obtaining a pointer to the first proxy object;
invoking the marshalling function member of the proxy object; and
sending the unmarshal class identifier and the identifier of the stub to the second client process; and within the second client process,
receiving the unmarshal class identifier and the identifier of the stub from the first client process;
accessing code to instantiate a second proxy object of the class identified by the unmarshal class identifier;
executing the accessed code, including the substeps of:
instantiating a second a proxy object of the class identified by the unmarshal class identifier, and
initializing the second proxy object to contain a reference to the identified stub so that when the second proxy object receives requests from the second client process to invoke a function member of the object, the second proxy object sends the request to the identified stub; and
obtaining a pointer to the second proxy object, whereby the first client process may use the pointer to the first proxy object to invoke function members of the object instantiated within the server process and the second client process may use the pointer to the second proxy object to make function members of the object instantiated in the server process.

30. The method of claim 29 wherein the accessing steps each include the step of selecting earlier loaded code capable of instantiating an object of the class identified by the unmarshal class identifier.

31. The method of claim 29 wherein the accessing steps each include the step of dynamically loading code capable of instantiating an object of the class identified by the unmarshal class identifier.

32. The method of claim 29 wherein the accessing steps each include the steps of:

if already loaded code is capable of instantiating an object of the class identified by the unmarshal class identifier, selecting the already loaded code; and
if no already loaded code is capable of instantiating an object of the class identified by the unmarshal class identifier, dynamically loading code to instantiate an object of the class identified by the unmarshal identifier.

33. The method of claim 31 or 32 wherein the step of dynamically loading code includes the step of:

within each of the client processes,
retrieving from a persistent registry a persistent registry entry indicator of the code to dynamically load, the persistent registry having an entry associating the unmarshal class identifier with the persistent registry entry indicator.

34. The method of claim 29 wherein the object has a plurality of interfaces and the pointer to the object is a pointer to one of the interfaces of the object.

35. A method in a computer system of passing a pointer to an object of a selected class from a server process to a client process to enable the client process to invoke function members of the object, the method comprising the steps of:

within the server process,
instantiating the object in shared memory that is accessible by the server process and the client process, the instantiated object having a data access function member to access data members of the object;
storing an identifier of the selected class in a message as an unmarshal class identifier;
invoking a marshalling function member of the object instantiated within the server process to store a pointer to data members of the object in the message; and
sending the message to the client process; and within the client process,
receiving the message from the server process;
retrieving the unmarshal class identifier from the message;
accessing code to instantiate an object of the class identified by the unmarshal class identifier;
executing the accessed code to instantiate an object of the class identified by the unmarshal class identifier, thereby instantiating an object of the selected class, the object of the class identified by the unmarshal class identifier having an unmarshalling function member;
obtaining a pointer to the instantiated object of the class identified by the unmarshal class identifier: and
invoking the unmarshalling function member of the object of the class identified by the unmarshal class identifier, including the substeps of:
retrieving from the message the pointer to data members of the object instantiated within the server process, and storing in the object of the class identified by the unmarshal class identifier the retrieved pointer to the data members so that the data access function member of the object of the class identified by the unmarshal class identifier can access the data members in shared memory.

36. The method of claim 35 wherein the unmarshal class identifier identifies the same class as the object instantiated by the server process.

37. The method of claim 35 wherein the object instantiated by the server has a plurality of interfaces and the pointer to the object is a pointer to one of the interfaces of the object.

38. The method of claim 35 wherein the accessing step includes the step of selecting earlier loaded code capable of instantiating an object of the class identified by the unmarshal class identifier.

39. The method of claim 35 wherein the accessing step includes the step of dynamically loading code capable of instantiating an object of the class identified by the unmarshal class identifier.

40. The method of claim 35 wherein the accessing step includes the steps of:
if already loaded code is capable of instantiating an object of the class identified by the unmarshal class identifier, selecting the already loaded code; and
if no already loaded code is capable of instantiating an object of the class identified by the unmarshal class identifier, dynamically loading code to instantiate an object of the class identified by the unmarshal identifier.

41. The method of claim 39 or 40 wherein the step of dynamically loading code includes the step of:
within the client process,
retrieving from a persistent registry a persistent registry entry indicator of the code to dynamically load, the persistent registry having an entry associating the unmarshal class identifier with the persistent registry entry indicator.

42. A method in a computer system of passing a pointer to an immutable object having data members and function members from a server process to a client process, the method comprising the steps of:
within the server process,
instantiating the immutable object;
storing an unmarshal class identifier in a message;
invoking a marshalling function member of the immutable object to store the data members of the object in the message; and
sending the message to the client process; and
within the client process,
receiving the message from the server process;
retrieving the unmarshal class identifier from the message;
accessing code to instantiate an object of the class identified by the unmarshal class identifier;
executing the accessed code to instantiate an object of the class identified by the unmarshal class identifier, the object of the class identified by the unmarshal class identifier having an unmarshalling function member; and
invoking the unmarshalling function member of the object of the class identified by the unmarshal class identifier, including the substeps of:
retrieving the data members from the message, and storing the retrieved data members in the object of the class identified by the unmarshal class identifier so that the function members of the object of the class identified by the unmarshal class identifier can access the data members of the immutable object.

43. The method of claim 42 wherein the immutable object has a class, and wherein the unmarshal class identifier identifies the class of the immutable object.

44. The method of claim 42 wherein the immutable object has a plurality of interfaces and the pointer to the immutable object is a pointer to one of the interfaces of the immutable object.

45. The method of claim 42 wherein the accessing step includes the step of selecting earlier loaded code capable of instantiating an object of the class identified by the unmarshal class identifier.

46. The method of claim 42 wherein the accessing step includes the step of dynamically loading code capable of instantiating an object of the class identified by the unmarshal class identifier.

47. The method of claim 42 wherein the accessing step includes the steps of:
if already loaded code is capable of instantiating an object of the class identified by the unmarshal class identifier, selecting the already loaded code; and
if no already loaded code is capable of instantiating an object of the class identified by the unmarshal class identifier, dynamically loading code to instantiate an object of the class identified by the unmarshal identifier.

48. The method of claim 46 or 47 wherein the step of dynamically loading code includes the step of:
within the client process,
retrieving from a persistent registry a persistent registry entry indicator of the code to dynamically load, the persistent registry having an entry associating the unmarshal class identifier with the persistent registry entry indicator.

49. A method in a computer system for performing a function call from a server process to a function within a client process, the function call having an in parameter that is a pointer to an interface of a real object instantiated within the server process, the interface of the real object having a function member, the method comprising the steps of:
within the server process,
creating a stub for receiving a request invoke the function member;
marshalling an identifier of the stub into a message; and
sending the message to the client process; and
within the client process,
receiving the message from the server process;
unmarshalling the identifier of the stub;
creating a proxy for receiving the request to invoke the function member from the client process and sending it to the stub identified by the unmarshalled identifier;
obtaining a pointer to the created proxy; and
calling the function within the client process, passing the obtained pointer to the created proxy as an in parameter.

50. A method in a computer system for performing a function call from a client process to a function within a server process, the function call having an out parameter that is a pointer to an interface of a real object instantiated within the server process, the interface of the real object having a function member, the method comprising the steps of:
within the client process, initiating a call to the function within the server process;

within the server process,
- calling the function within the client process, the function producing the out parameter that is a pointer to the interface of the real object;
- creating a stub for receiving a request invoke the function member;
- marshalling an identifier of the stub into a message; and
- sending the message to the client process; and within the client process,
- receiving the message from the server process;
- unmarshalling the identifier of the stub;
- creating a proxy for receiving the request to invoke the function member from the client process and sending it to the stub identified by the unmarshalled identifier;
- obtaining a pointer to the created proxy; and
- returning the obtained pointer to the created proxy as an out parameter of the function call initiated within the client process.

* * * * *